US007627198B2

(12) United States Patent
Kondo et al.

(10) Patent No.: US 7,627,198 B2
(45) Date of Patent: Dec. 1, 2009

(54) INFORMATION SIGNAL PROCESSING DEVICE AND PROCESSING METHOD, CODEBOOK GENERATING DEVICE AND GENERATING METHOD, AND PROGRAM FOR EXECUTING THE METHODS

(75) Inventors: Tetsujiro Kondo, Tokyo (JP); Takashi Nakanishi, Tokyo (JP); Daisuke Kikuchi, Tokyo (JP); Shizuo Chikaoka, Tokyo (JP); Takeshi Miyai, Tokyo (JP); Yoshiaki Nakamura, Tokyo (JP); Tsugihiko Haga, Kanagawa (JP)

(73) Assignee: Sony Corporation, Tokyo (JP)

( * ) Notice: Subject to any disclaimer, the term of this patent is extended or adjusted under 35 U.S.C. 154(b) by 934 days.

(21) Appl. No.: 10/852,577

(22) Filed: May 25, 2004

(65) Prior Publication Data

US 2005/0008260 A1 Jan. 13, 2005

(30) Foreign Application Priority Data

May 29, 2003 (JP) ............................. 2003-153432
May 29, 2003 (JP) ............................. 2003-153433

(51) Int. Cl.
*G06K 9/32* (2006.01)
(52) U.S. Cl. ........................ 382/300; 382/299; 348/441; 348/538; 358/525; 704/265
(58) Field of Classification Search ................... 382/300
See application file for complete search history.

(56) References Cited

U.S. PATENT DOCUMENTS 5,469,216 A * 11/1995 Takahashi et al. ............ 348/441
5,663,764 A * 9/1997 Kondo et al. ............. 375/240.14
5,852,470 A * 12/1998 Kondo et al. ................ 348/448
5,859,667 A * 1/1999 Kondo et al. ............. 375/240.14
6,201,833 B1 3/2001 Kondo et al.
7,372,997 B2 * 5/2008 Kondo ........................ 382/225
2005/0071357 A1 * 3/2005 Kondo ........................ 707/101

FOREIGN PATENT DOCUMENTS

| JP | 7-75066 | 3/1995 |
|----|---------|--------|
| JP | 07-095591 | 4/1995 |
| JP | 7-95591 | 4/1995 |
| JP | 7-154642 | 6/1995 |
| JP | 09-083961 | 3/1997 |
| JP | 10-112843 | 4/1998 |
| JP | 11-004413 | 1/1999 |
| JP | 2000-059740 | 2/2000 |
| JP | 2000-59740 | 2/2000 |
| JP | 2003-153212 | 5/2003 |
| JP | 2003-323612 | 11/2003 |
| WO | WO 03/096273 | 11/2003 |

OTHER PUBLICATIONS

Patent Abstracts of Japan, JP 11-191880, Jul. 13, 1999.

(Continued)

*Primary Examiner*—Sath V Perungavoor
(74) *Attorney, Agent, or Firm*—Oblon, Spivak, McClelland, Maier & Neustadt L.L.P.

(57) ABSTRACT

Standard Definition signals are divided into blocks at a tap extracting unit, and pixel data contained in each block is extracted as a class tap. A class classification unit obtains class code based on the pixel data contained in the class tap. An auxiliary data generating unit generates auxiliary data regarding conversion into High Definition signals, based on the class tap extracted by the tap extracting unit. A data generation processing unit performs processing based on the class code and the auxiliary data, thereby yielding excellent High Definition signals.

28 Claims, 23 Drawing Sheets

OTHER PUBLICATIONS

Patent Abstracts of Japan, JP 11-055630, Feb. 26, 1999.
Patent Abstracts of Japan, JP 11-004413, Jan. 6, 1999.
Patent Abstracts of Japan, JP 10-164520, Jun. 19, 1998.
Patent Abstracts of Japan, JP 09-083961, Mar. 28, 1997.

* cited by examiner

FIG. 5

| SD CODE #c | FEATURES (DR) | HD CODE #C | HD CODE VECTOR (Q1, Q2, Q3, Q4) |
|---|---|---|---|
| 0 | DR<64 | 0 | (100, 100, 100, 100) |
| 0 | DR≧64 | 1 | (100, 100, 120, 110) |
| 1 | DR<96 | 2 | (50, 100, 150, 200) |
| 1 | 128>DR≧96 | 3 | (50, 90, 150, 200) |
| 1 | DR≧128 | 1 | (100, 100, 120, 110) |
| ⋮ | ⋮ | | ⋮ |

| HD CODE VECTOR (Q1, Q2, Q3, Q4) | HD CODE #C |
|---|---|
| (100, 100, 100, 100) | 0 |
| (100, 100, 120, 110) | 1 |
| (50, 100, 150, 200) | 2 |
| ⋮ | ⋮ |

FIG. 14

| CODE #C | HD CODE VECTOR (Q1, Q2, Q3, Q4) |
|---|---|
| 0 | (100, 100, 100, 100) |
| 1 | (50, 100, 150, 200) |
| 2 | (0, 100, 200, 300) |
| ⋮ | ⋮ |

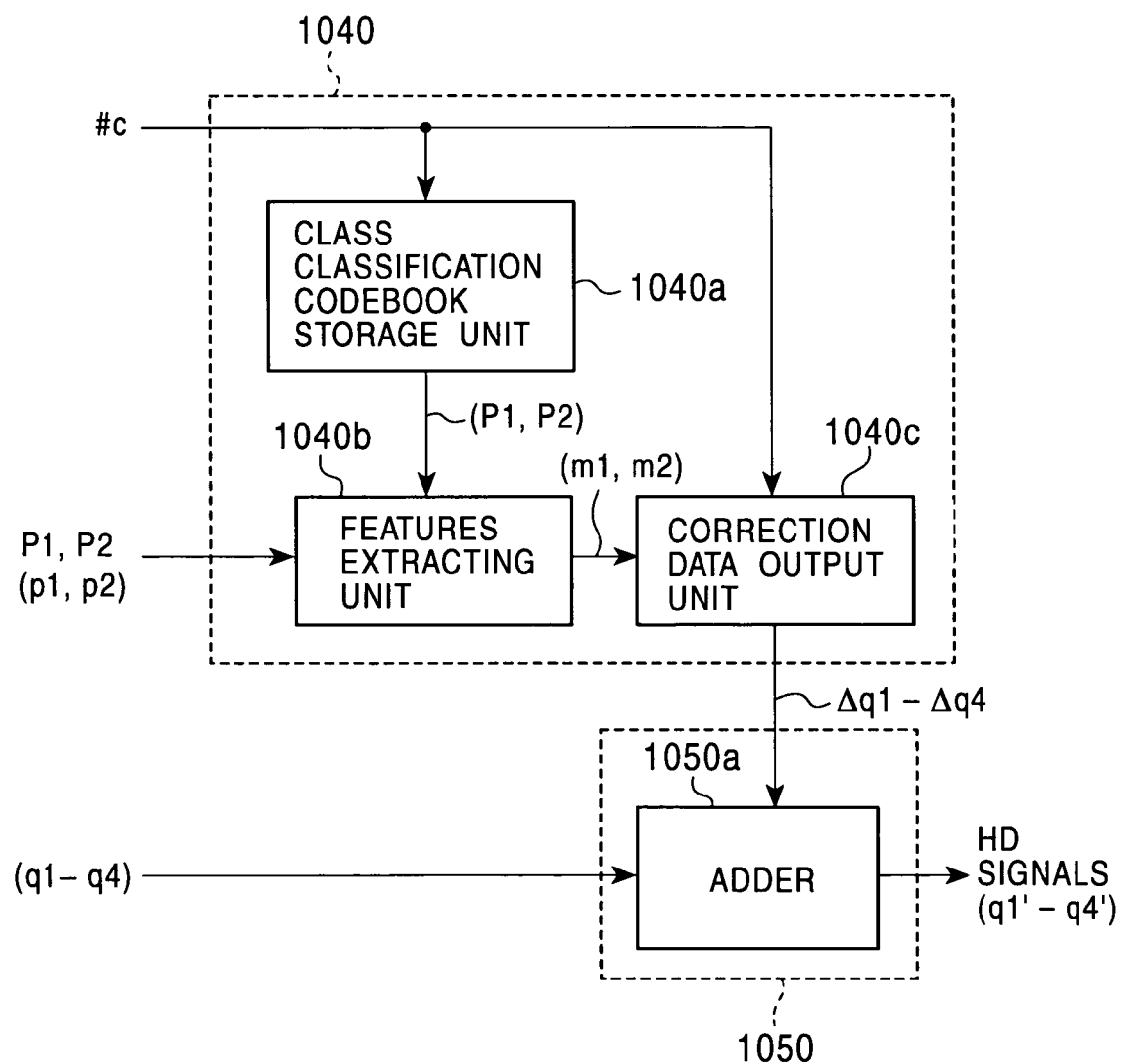

FIG. 17

| CLASS CODE #c | CODE INFORMATION | | CORRECTION DATA Δq1, Δq2, Δq3, Δq4 |
|---|---|---|---|
| | m1 | m2 | |
| 0 | 1 | 1 | • • • |
| | 1 | 0 | • • • |
| | 0 | 1 | • • • |
| | 0 | 0 | • • • |
| 1 | 1 | 1 | • • • |
| | 1 | 0 | • • • |
| | 0 | 1 | • • • |
| | 0 | 0 | • • • |
| 2 | 1 | 1 | • • • |
| | 1 | 0 | • • • |
| | 0 | 1 | • • • |
| • • • | • • • | • • • | • • • |

FIG. 19

| TUTOR DATA<br>q1, q2, q3, q4 | STUDENT DATA<br>p1, p2 |
|---|---|
| q1(1), q2(1), q3(1), q4(1) | p1(1), p2(1) |
| q1(2), q2(2), q3(2), q4(2) | p1(2), p2(2) |
| ⋮ | ⋮ |
| q1(N), q2(N), q3(N), q4(N) | p1(N), p2(N) |

FIG. 20

| TUTOR DATA<br>q1, q2, q3, q4 | CLASS CODE #c OF CORRESPONDING STUDENT |
|---|---|
| q1(1), q2(1), q3(1), q4(1) | #c 1 |
| q1(2), q2(2), q3(2), q4(2) | #c 2 |
| ⋮ | ⋮ |
| q1(N), q2(N), q3(N), q4(N) | #c N |

INFORMATION SIGNAL PROCESSING DEVICE AND PROCESSING METHOD, CODEBOOK GENERATING DEVICE AND GENERATING METHOD, AND PROGRAM FOR EXECUTING THE METHODS

BACKGROUND OF THE INVENTION

1. Field of the Invention

The present invention relates to an information signal processing device and processing method, codebook generating device and generating method, and program for executing the methods, suitable for applying to conversion of standard or low-definition-equivalent standard television signals (SD signals) into high-definition signals (HD signals).

In further detail, the present invention relates to an information signal processing device wherein, at the time of converting first information signals made up of a plurality of pieces of information data into second information signals made up of a plurality of pieces of information data, one or a plurality of pieces of information data making up the second information signals are generated for each block comprising one or a plurality of pieces of information data obtained by dividing the first information signals, based on data based on class taps of the information data contained in the blocks and on auxiliary data, whereby the first information signals can be suitably converted into second information signals.

More specifically, the present invention relates to an information signal processing device wherein, at the time of converting first information signals made up of a plurality of pieces of information data into second information signals made up of a plurality of pieces of information data, one or a plurality of pieces of information data making up the second information signals are generated for each block comprising one or a plurality of pieces of information data obtained by dividing the first information signals, based on the class code of class taps made up of information data contained in the blocks and features thereof, whereby the first information signals can be suitably converted into second information signals.

More specifically yet, the present invention relates to an information signal processing device wherein, at the time of converting first information signals made up of a plurality of pieces of information data into second information signals made up of a plurality of pieces of information data, one or a plurality of pieces of information data making up the second information signals are generated for each block comprising one or a plurality of pieces of information data obtained by dividing the first information signals, based on the class code of class taps made up of information data contained in the blocks, and further correcting this generated data using correction data obtained based on range information of the components making up error vectors which are obtained by performing subtraction between tap vectors having as the components thereof the information data contained in the class taps, and representative vectors corresponding to the class code, whereby the first information signals can be suitably converted into second information signals.

2. Description of the Related Art

There is a technique in image signal processing, for example, wherein image signals are classified into multiple classes, and processing is performed corresponding to each class, as described in Japanese Unexamined Patent Application Publication No. 7-95591 and Japanese Unexamined Patent Application Publication No. 2000-59740. For example, in the event that classification is performed based on the activity of image signals, image signals with high activity which have a great amount of change, and image signals with low activity which are flat can be classified separately, and accordingly can be subjected to processing suitable for each class.

According to such image signal processing with class classification as described above, image signal processing suitable for image signals of each class can be performed for each of the image signals divided into the classes, and accordingly the greater the number of classes, the more suitable processing should be able to be performed on the classified image signals, at least theoretically. However, in the event that the number of classes becomes great, the number of patterns of processing performed according to each class also becomes great, resulting in a massive device.

For example, in the event of classifying classes based on activity as in the example above, as many classes need to be prepared as the values which the activities are capable of assuming, so that processing suitable for, the activity of image signals of each activity can be carried out. However, in the event that N difference values of adjacent pixels of which a plurality are arrayed in the horizontal direction are employed as the activity for example, and in the event that the difference value is K bits, the total number of classes is a staggering $(2^K)^N$ classes.

Accordingly, class classification is performed using some sort of compression processing, such as ADRC (Adaptive Dynamic Range Coding) or the like. With class classification using ADRC, the N difference values such as in the example above serving as the data used for the class classification (hereafter referred to as "class taps") are subjected to ADRC processing, and the ADRC code obtained thereby is used for class determination.

With K-bit ADRC, for example, the maximal value MAX and minimal value MIN of the values of the data making up the class tap is detected, DR=MAX−MIN is set as a local dynamic range of the set, and based on this dynamic range DR, the minimal value MIN is subtracted from the values of the data making up the class tap, and the subtracted value is divided by $DR/2^K$ (quantized). A bit string, wherein the K-bit values regarding the data making up the class tap obtained as described above are arrayed in a predetermined order, is output as ADRC code.

Accordingly, in the event that the class tap is subjected to 1-bit ADRC processing for example, the minimal value MIN is subtracted from each piece of data making up the class tap, and then divided by (MAX−MIN)/2, so that each piece of data is 1 bit. The bit string wherein this 1-bit data is arrayed in a predetermined order is output as ADRC code.

Now, class classification can be performed by vector quantization for example, and the like, besides ADRC processing. In the event of performing class classification using compressing processing as described above, the number of classes can be reduced, but on the other hand, fine classification cannot be performed as with cases of performing class classification without compressing processing, meaning that suitable processing cannot be applied to the image signals.

For example, let us consider a case of image signal processing wherein class classification of first image signals is performed using vector quantization, so as to generate second image signals for each class. In this case, the first image signal is divided into blocks made up of multiple pieces of pixel data. Vectors having as the components thereof the multiple pieces of pixel data making up the blocks (hereafter also referred to as "block vectors") are configured for each block. Further, each block vector is subjected to vector quantization using a pre-obtained codebook, and code (symbols) obtained as the result of the vector quantization is output as class code indicating the class of the block vector.

Pixel data for the second image signals is then generated for each class code. That is to say, the class code is subjected to inverse vector quantization using the codebook, and the block vector corresponding to the class code is obtained. A block containing the components of the block vector as pixel data is obtained, and the second image signals are generated by positioning the block at the corresponding position.

However, with the second image signals obtained by the inverse vector quantization as high-image quality image signals and the first image signals to be subjected to vector quantization as low-image quality image signals, the block vectors of the low-quality image signals which are to be subjected to vector quantization of the same class code are all subjected to inverse vector quantization by the same code vector, i.e., the block vector of the same high-quality image signals. This means that block vectors obtained by inverse block vector quantization have so-called quantization error. Accordingly, even though the image signals generated with the above-described processing are called high-quality image signals, the quality thereof has deteriorated by an amount corresponding to the quantization error in comparison with the high-quality image signals used for compiling the inverse quantization codebook.

SUMMARY OF THE INVENTION

Accordingly, it is an object of the present invention to solve the above problems and provide for suitable conversion of the first information signals into the second information signals.

According to a first aspect of the present invention, an information signal processing device, for converting a first information signal made up of a plurality of sets of information data into a second information signal made up of a plurality of sets of information data, comprises: a class tap extracting unit for dividing the first information signal into blocks each made up of one or more sets of information data, and extracting the information data contained in each of the blocks as class taps for each block; a class classification unit for, based on the class taps extracted by the class tap extracting unit, classifying the class taps into one of a plurality of classes, so as to obtain a class code; an auxiliary data generating unit for generating auxiliary data based on data based on at least class taps extracted by the class tap extracting unit; and a data generating processing unit for generating the second information signal, generated corresponding to the class taps, based on the data based on the class taps, and the auxiliary data; wherein the second information signal needs the auxiliary data at a first stage or a second stage of the generating process at the data generating processing unit.

The first stage in the generating process may be a stage wherein a signal to be subjected to the conversion is a lower level signal than the second information signal, and the second stage in the generating process may be a stage wherein a signal to be subjected to the conversion is of a signal level which equal to the second information signal. Also, the data based on class taps may be class code. Further, the auxiliary data generating unit may generate based on data based on the class taps and features based on the class taps.

Now, "features" as used here means the dynamic range of the information data within class taps, dispersion values, standard deviation, waveform patterns, difference data between the tap vector and code vector corresponding to the class code, and so forth.

The auxiliary data generating unit may have a features obtaining unit for obtaining features relating to the class taps based on the class taps extracted at the class tap extracting unit, and taking the features as the auxiliary data, with the data generating processing unit generating information data made up of one or a plurality of sets of information data making up the second information signals, corresponding to the class taps generated based on the class code obtained based on the class taps, and the features.

The class classification unit may subject tap vectors, having as a component thereof information data contained in class taps extracted by the class tap extracting unit, to vector quantization using a codebook, thereby obtaining class code corresponding to the class taps.

The class classification unit may further comprise: a storage unit for storing a codebook wherein representative vectors regarding the first information signal representing each of the plurality of classes have assigned thereto class code indicating the corresponding class; and a vector quantization unit for obtaining the distance of the tap vector and the representative vectors of the plurality of classes based on the codebook, and outputting the class code assigned to the representative vector wherein the distance is the smallest.

The data generating unit may subject the class code to inverse vector quantization using a codebook, based on the class code obtained by the class classification unit and features obtained by the features obtaining unit, thereby obtaining a code vector having as the components thereof the one or plurality of pieces of information data making up the second information signals.

The data generating unit may further comprise: a storage unit for sorting a codebook wherein representative vectors regarding the second signals are appropriated to combinations of the class code and the features; and an inverse vector quantization unit for obtaining the representative vector appropriated to the combination of class code obtained by the class classification unit and features obtained by the features obtaining unit, based on the codebook, and outputting the obtained representative vector as the code vector.

The codebook may be obtained by learning beforehand. Also, the information signals may be image signals or audio signals.

The auxiliary data generating unit may further comprise a correction data calculating unit for calculating correction data used by the data output unit, based on the class code obtained by the class classification unit and the class tap extracted by the class tap extracting unit, with the data generating unit comprising a data generating unit for generating one or a plurality of pieces of information data making up the second information signals corresponding to the class tap, based on the class code obtained by the class classification unit, and a data correcting unit for correcting the one or a plurality of pieces of information data generated by the data generating unit.

The class classification unit may subject the tap vector having as the components thereof information data contained in the class tap extracted by the class tap extracting unit to vector quantization, using a codebook wherein representative vectors regarding the first information signals which represent each class have appropriated thereto class code indicating a corresponding class, for each of the plurality of classes, thereby obtaining class code corresponding to the class tap; with the correction data calculating unit obtaining the correction data based on range information of the components making up an error vector, and based on the class code, the error vector having been obtained by performing subtraction between a tap vector having as the components thereof the information data contained in the class tap, and the representative vector corresponding to the class code.

The range information of values of the components making up the error vector may be negative/positive symbol information of the values of the components making up the error vector.

The data generating unit may subject the class code obtained by the class classification unit to inverse vector quantization using a codebook wherein representative vectors regarding the second information signals are appropriated to the class codes, thereby obtaining a code vector having as the components thereof one or a plurality of pieces of information data making up the second information signals.

The correction data calculating unit may extract second features from first features based on the class tap, and generate the correction data based on the second features.

The correction data calculating unit may further comprise a features class classification unit for obtaining features class code by classifying the first features into one of a plurality of features classes, with regard to the second features.

The correction data calculating unit may comprise: a storage unit for storing a codebook wherein representative vectors regarding the first information signals representing each class have appropriated thereto class code indicating the corresponding class, for each of the plurality of classes; a features extracting unit for performing subtraction between a tap vector having as the components thereof information data contained in the class tap, and the representative vector read out from the storage unit corresponding to the class code so as to obtain the error vector, thereby obtaining range information of values of each component making up the error vector; and a correction data output unit for outputting the correction data based on the class code and the range information obtained by the features extracting unit.

The correction data output unit may read out and output correction data corresponding to the class code obtained by the class classification unit and range information obtained by the features extracting unit, from a correction data table wherein each combination of the class code and the range information has appropriated thereto the correction data. The correction data table may be obtained by learning beforehand.

Thus, the present invention is capable of performing conversion processing of first information signals into second information signals more suitably than performing conversion based only on class code, and accordingly excellent conversion can be realized.

Also, the generated information data is corrected using correction data, and accordingly first information signals can be converted into second information signals even more suitably.

According to a second aspect of the present invention, a codebook generating device, for generating a codebook used for converting first information signals made up of a plurality of pieces of information data into second information signals made up of a plurality of pieces of information data, by obtaining representative vectors having as the components thereof one or multiple pieces of information data making up the second information signals for each block made up of one or multiple pieces of information data obtained by dividing the first information signals into blocks, based on the class code of the class tap of information data contained in the block and features thereof, comprises: a first tap extracting unit for extracting, as a first tap, information data contained in each first block made up of one or a plurality of process of information data, obtained by dividing student signals corresponding to the first information signals; a second tap extracting unit for extracting, as a second tap, information data contained in each second block made up of one or a plurality of pieces of information data obtained by dividing tutor signals corresponding to the second information signals, corresponding to the first blocks; a class classification unit for classifying the first tap into one of a plurality of classes based on the first tap extracted by the first tap extracting unit, thereby obtaining class code; a codebook generating information obtaining unit for obtaining information necessary for generating a codebook, based on the first tap; and a codebook generating unit for generating the codebook based on the codebook generating information and the plurality of representative vectors.

The codebook generation information obtaining unit may further comprise: a features obtaining unit for obtaining features relating to the first tap, based on the first tap extracted by the first tap extracting unit; and a storage unit for storing a plurality of representative vector having as the components thereof one or a plurality of pieces of information data corresponding to second taps each extracted by the second tap extracting unit, regarding the second information signals; with the codebook generating unit generating the codebook by appropriating one representative vector selected from the plurality of representative vectors, to each combination of the class code and the features, based on the class code obtained by the class classification unit, the features obtained by the features obtaining unit, the second tap extracted by the second tap extracting unit, and the plurality of representative vectors stored in the storage unit.

The codebook generating unit may obtain, for each combination of the class code and the features, the error between information data contained in each of the plurality of second taps corresponding to the plurality of first taps matching the combination and components within the representative vector, and add the obtained plurality of errors so as to obtain a sum of errors, and further repeat this processing a number of times equal to the number of the plurality of representative vectors, and appropriate one representative vector wherein the sum of errors is the smallest to the combination thereof.

The class classification unit may subject a vector having as the components thereof information data contained in the first tap extracted by the first tap extracting unit to vector quantization using a codebook, thereby obtaining class code corresponding to the class tap.

The class classification unit may comprise: a storage unit for storing a codebook wherein representative vectors regarding the first information signals representing each class have appropriated thereto class code indicating the corresponding class, for each of the plurality of classes; and a vector quantization unit for obtaining the distance between a vector having as the components thereof the information data contained in the first tap, and the plurality of representative vectors, based on the codebook, and outputting the class code appropriated to the representative vector which minimizes the distance.

According to a third aspect of the present invention, a correction data table generating device, for generating a correction data table, used for converting first information signals made up of a plurality of pieces of information data into second information signals made up of a plurality of pieces of information data, by generating one or multiple pieces of information data making up the second information signals for each block made up of one or multiple pieces of information data obtained by dividing the first information signals into blocks, based on the class code of the class tap of information data contained in the block, and correcting the generated one or plurality of pieces of information data with correction data, comprises: a first tap extracting unit for extracting, as a first tap, information data contained in each first block made up of one or a plurality of process of information data, obtained by dividing student signals corresponding to the first information signals; a second tap extracting unit for extracting, as a second tap, information data contained in each second block made up of one or a plurality of pieces of information data obtained by dividing tutor signals corresponding to the second information signals, corresponding to the first blocks; a class classification unit for classifying the class tap into one of a plurality of classes to obtain a class code, based on the first tap extracted by the first tap extracting unit; a table generation information calculating unit for calculating plurality of pieces of table generation information necessary for generating tables, based on each of the class code, the first tap, and the second tap; and a correction data table generating unit for generating a correction data table where correction data has been appropriated, based on the class code and the table generation information.

The class classification unit may subject the first tap extracted by the first tap extracting unit to vector quantization, using a codebook wherein class code is appropriated to corresponding representative vectors representing a plurality of classes regarding the first information signals.

The table generation information calculating unit may comprise: a data generating unit for subjecting class code obtained by the class classification unit to inverse vector quantization using a codebook which has appropriated representative vectors regarding the second information signals to the class code, and obtaining a representative vector appropriated to the class code obtained by the class classification unit; a first error computing unit for obtaining an error vector by performing subtraction between a tap vector having as the components thereof information data contained in the first tap extracted by the first tap extracting unit and a representative vector regarding the first information corresponding to the class code obtained by the class classification unit; and a range information obtaining unit for obtaining range information of the values of each of the components making up the error vector obtained by the first error computing unit; with the correction data table generating unit generating a correction data table wherein each of the combinations of the class code and the range information have appropriated thereto correction data corresponding to the combination, by learning using the range information obtained by the range information obtaining unit, an error vector obtained by the second error computation unit, and the class code obtained by the class classification unit.

The correction data table generating unit may further comprise a learning unit, with the learning unit obtaining, for each combination of the class code and the range information, the center of gravity of the plurality of error vectors obtained by the second error calculation unit corresponding to the combination, and appropriating the components making up the obtained center-of-gravity vector as the correction data of the combination.

In the correction data table generating device, the range information of the values of the components making the error vector may be positive/negative symbol information of the values of the components making the error vector.

Further aspects of the present invention include a method for realizing the first through third aspects, and programs for causing a computer to carry out the methods.

BRIEF DESCRIPTION OF THE DRAWINGS

FIG. 5 is a diagram illustrating an example of a data generating codebook;

FIG. 14 is a diagram illustrating an example of a data generating codebook;

FIG. 16 is a block diagram illustrating the configuration of a correction data calculating unit and a data correction unit;

FIG. 17 is a diagram illustrating an example of a correction data table;

FIG. 19 is a diagram describing learning pair data;

FIG. 20 is a diagram describing code pair tutor data;

DESCRIPTION OF THE PREFERRED EMBODIMENTS

Figure 25:
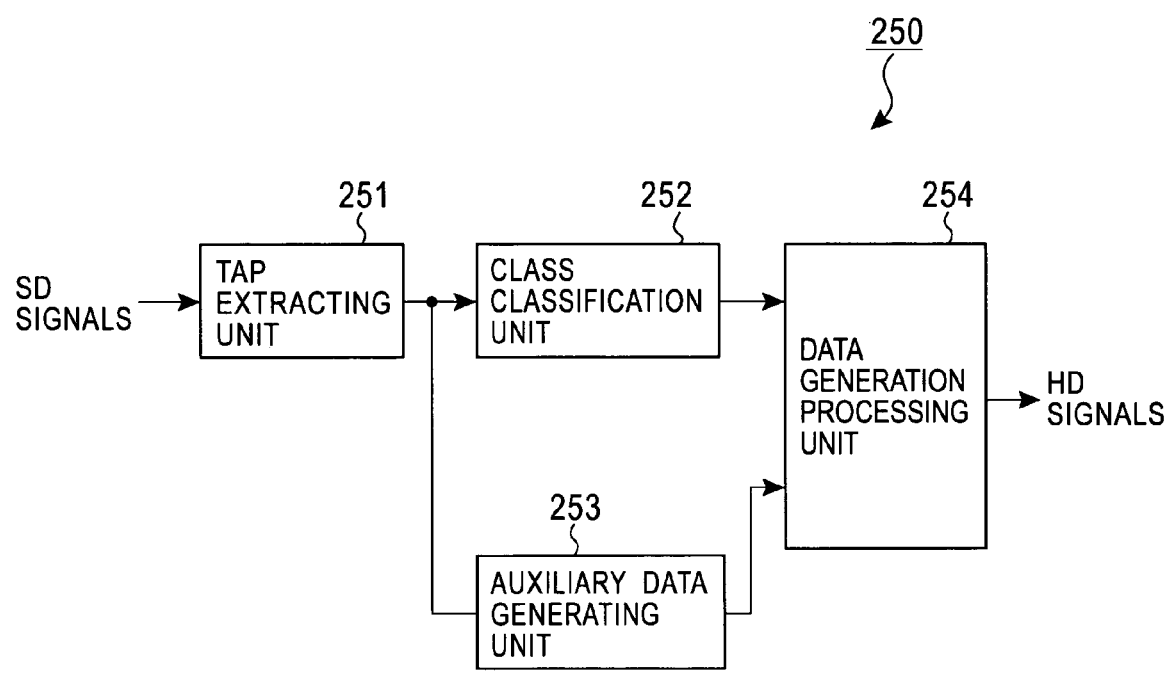
FIG. 25 is a block diagram illustrating the overall image processing device.

Embodiments of the present invention will be describe with reference to the drawings. FIG. 25 illustrates the configuration of an image signal processing device 250 as an embodiment. The image signal processing device 250 converts low-definition or standard-definition image signals (hereafter referred to as "SD (Standard Definition) signals") into high-definition image signals (hereafter referred to as "HD (High Definition) signals").

Figure 2:
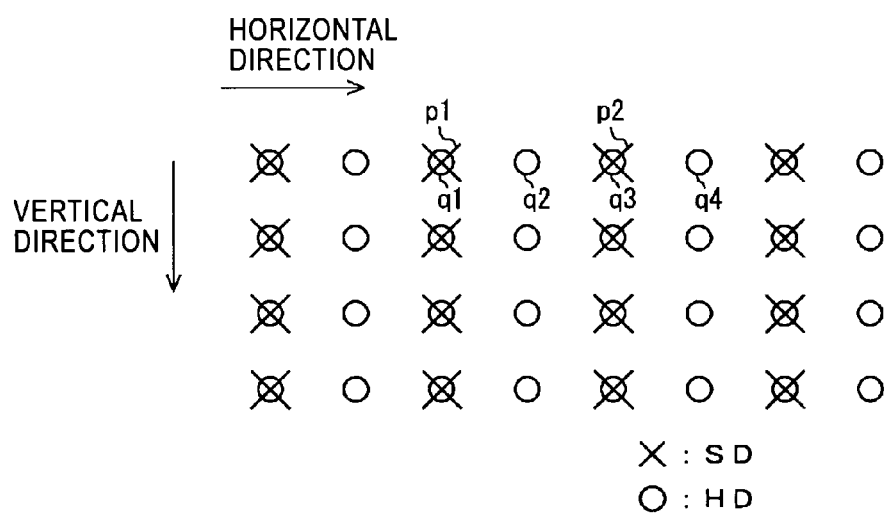
FIG. 2 is a diagram illustrating the relation between the position of pixels with SD signals and HD signals.

FIG. 2 illustrates the relation of the position of pixels between SD signals and HD signals. The "X"s represent the pixel positions in SD signals, and the circles represent the pixel positions in HD signals. In this case, two pixels in the SD signals correspond to four pixels in the HD signals.

Returning to FIG. 25, the image signal processing device 250 comprises a tap extracting unit 251. This tap extracting unit 251 receives supply of SD signals to be converted. The SD signals are made up of multiple pieces of 8-bit pixel data. The tap extracting unit 251 divides the SD signals into blocks made up of one or multiple pieces of pixel data. In the present embodiment, a block is made up of two pieces of pixel data, p1 and p2, adjacent in the horizontal direction (FIG. 2), and the pixel data p1 and p2 contained in the blocks is extracted as class taps.

Figures 3, 4:
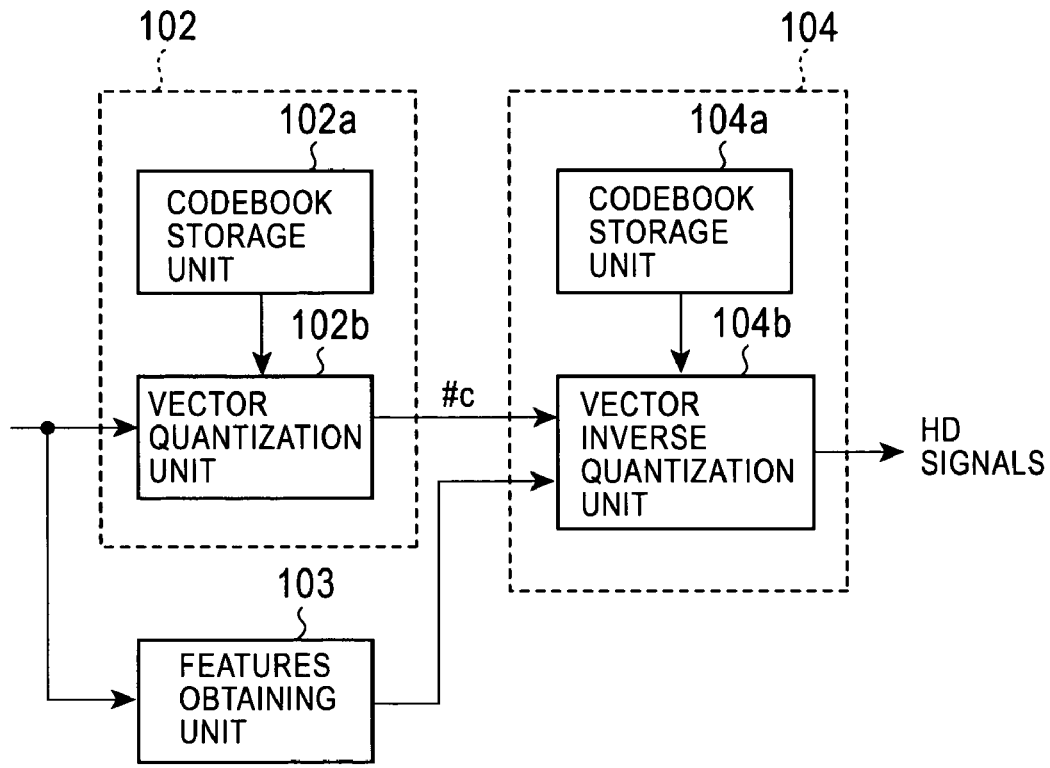
FIG. 3 is a block diagram illustrating the configuration of a class classification unit and a data generating unit.
FIG. 4 is a diagram illustrating an example of a class classification codebook.
Figure 13:
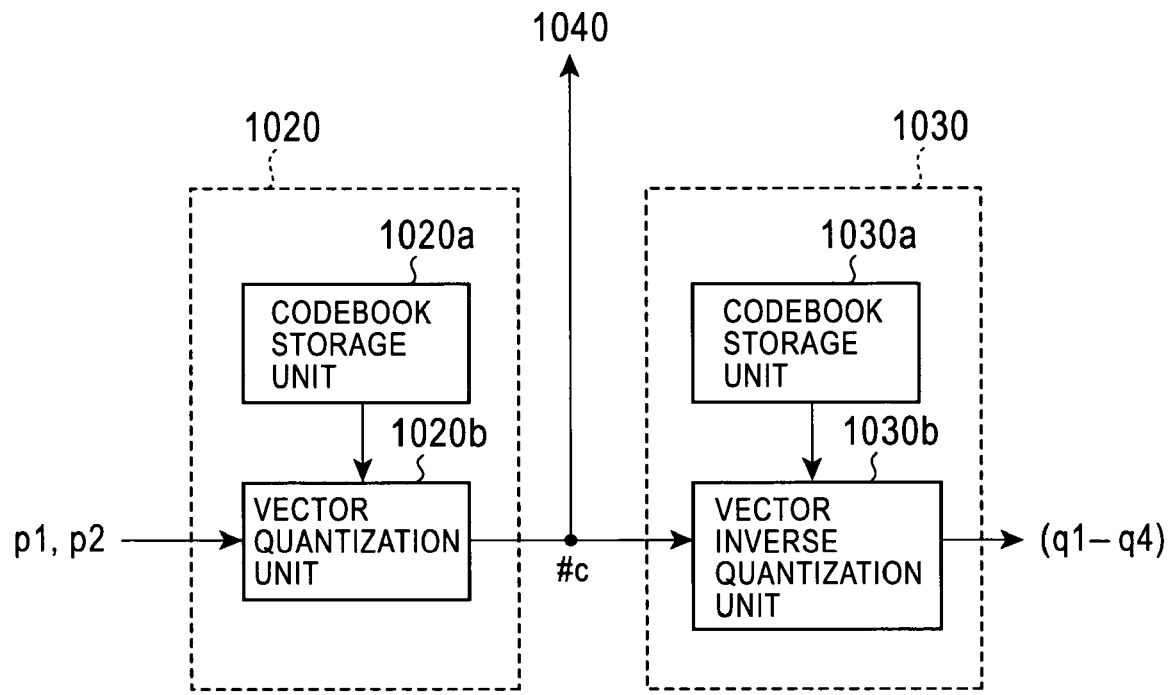
FIG. 13 is a block diagram illustrating the configuration of a class classification unit and data generating unit.

Also, the image signal processing unit 250 has a class classification unit 252. The class classification unit 252 classifies each class tap into one of multiple classes based on the class tap extracted by the tap extracting unit 251, and obtains a class code corresponding to the class tap. The class classification unit 252 subjects a tap vector (p1, p2) having as components thereof the pixel data p1 and p2 contained in the class tap, to vector quantization using a class classification codebook, and obtains a class code corresponding to the class tap. The class classification unit 252 comprises a codebook storage unit 102*a* and a vector quantization unit 102*b*, or a codebook storage unit 1020*a* and a vector quantization unit 1020*b*, as shown in FIGS. 3 and 13.

A class classification codebook obtained beforehand is stored in the codebook storage unit 102*a*. The class classification codebook is appropriation information wherein SD code vectors (P1, P2) serving as representative vectors for the SD signals representing each class have appropriated thereto class code (SD code) #c indicating the corresponding class, for each of the multiple classes, as shown in FIG. 4.

With the present embodiment, the tap vectors (p1, p2) to be subjected to vector quantization are two-dimensional vectors, so the SD code vectors (P1, P2) are also two-dimensional vectors. How to generate the class classification codebook will be described later.

The vector quantization unit 102*b* obtains the distance between the above-described tap vectors (p1, p2) and the SD code vectors of multiple classes (P1, P2), based on the class classification codebook stored in the codebook storage unit 102*a*, and outputs the class code #c appropriated to the SD code vector (P1, P2) which minimizes this distance.

Returning to FIG. 25, the image signal processing device 250 also comprises an auxiliary data generating unit 253. An example of the auxiliary data generating unit is a features obtaining unit, and another example of the auxiliary data generating unit is a correction data calculating unit. The configurations and methods regarding these examples will be described later.

Also, the image signal processing device 250 further comprises a data generation processing unit 254. The data generation processing unit 254 generates one or multiple pieces of pixel data making up an HD signal, corresponding to the class tap extracted by the tap extracting unit 251, based on the class code obtained by the class classification unit 252 and the auxiliary data obtained by the auxiliary data generating unit 253. In the case of the present embodiment, the data generation processing unit 254 generates four pieces of pixel data q1 through q4 which are adjacent in the horizontal direction (see FIG. 2).

An example of the data generation processing unit 254 is a data generating unit, and another example thereof is a data generating unit and a data correction unit. The former is necessary at the first stage of the auxiliary data to be supplied being generated at the data generation processing unit, i.e., at a signal stage wherein the signals to be converted are of the same level as SD signals or a level lower than HD signals. The latter is necessary at the later stage of the auxiliary data to be supplied being generated at the data generation processing unit, i.e., at a signal stage wherein the signals to be converted are of the same level as HD signals. Here, the level is determined by the amount of pixels making up the image, or the image quality.

First Embodiment

Figure 1:
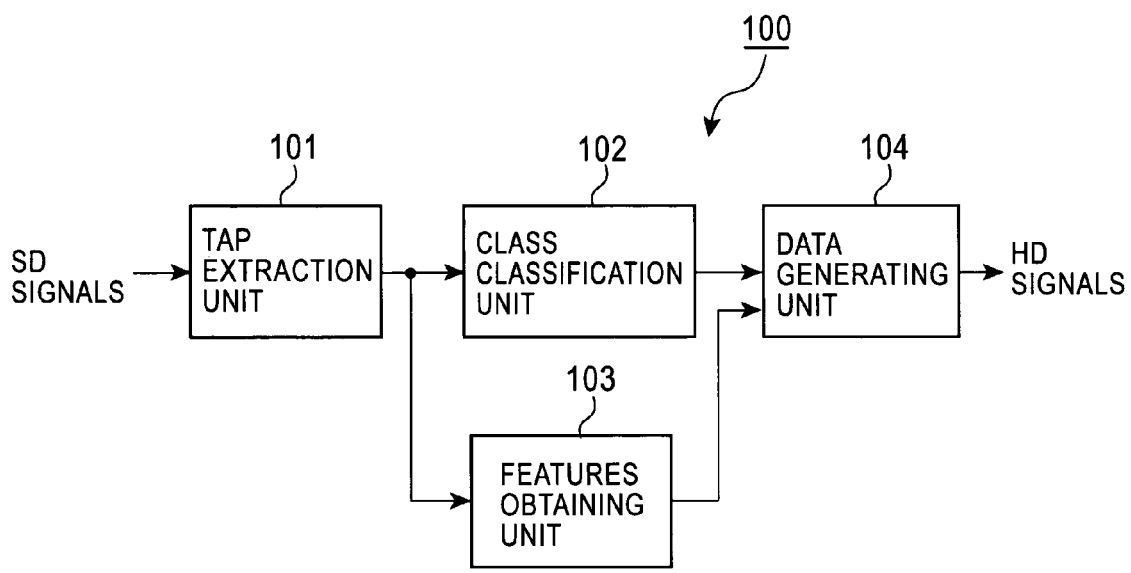
FIG. 1 is a block diagram illustrating the configuration of an image signal processing device.

A first embodiment of the present invention will be described with reference to the drawings. FIG. 1 illustrates the configuration of an image signal processing device 100. The image signal processing device 100 converts SD signals into HD signals. The positional relation between the SD signals and HD signals is as shown in FIG. 2.

In FIG. 1, the image signal processing device 100 comprises a tap extracting unit 101. This tap extracting unit 101 receives supply of SD signals to be converted. The SD signals are made up of multiple pieces of 8-bit pixel data. The tap extracting unit 101 divides the SD signals into blocks made up of one or multiple pieces of pixel data. In the present embodiment, a block is made up of two pieces of pixel data, p1 and p2, adjacent in the horizontal direction (FIG. 2), and the pixel data p1 and p2 contained in the blocks is extracted as class taps.

Also, the image signal processing unit 100 has a class classification unit 102. The class classification unit 102 classifies each class tap into one of multiple classes based on the class tap extracted by the tap extracting unit 101, and obtains a class code corresponding to the class tap. The class classification unit 102 subjects a tap vector (p1, p2) having as components thereof the pixel data p1 and p2 contained in the class tap, to vector quantization using a class classification codebook, and obtains a class code corresponding to the class tap. The class classification unit 102 comprises a codebook storage unit 102*a* and a vector quantization unit 102*b* as shown in FIG. 3.

A class classification codebook obtained beforehand is stored in the codebook storage unit 102*a*. The class classification codebook is appropriation information wherein SD code vectors (P1, P2) serving as representative vectors for the SD signals representing each class have appropriated thereto class code (SD code) #c indicating the corresponding class, for each of the multiple classes, as shown in FIG. 4.

With the present embodiment, the tap vectors (p1, p2) to be subjected to vector quantization are two-dimensional vectors, so the SD code vectors (P1, P2) are also two-dimensional vectors. How to generate the class classification codebook will be described later.

The vector quantization unit 102*b* obtains the distance between the above-described tap vectors (p1, p2) and the SD code vectors of multiple classes (P1, P2), based on the class classification codebook stored in the codebook storage unit 102*a*, and outputs the class code #c appropriated to the SD code vector (P1, P2) which minimizes this distance.

Returning to FIG. 1, the image signal processing device 100 also comprises a features extracting unit 103. Based on a class tap extracted at the tap extracting unit 101, the features extracting unit 103 obtains features relating to this class tap. The features here is the dynamic range DR of the pixel data within the class tap, for example, the dynamic range DR is the difference between the maximum value and the minimum value of the pixel data within the class tap. Note that the features does not have to be the dynamic range DR as described here, and may be dispersion values of the pixel value within the class tap, standard deviation, waveform patterns, difference data between the tap vector and code vector corresponding to the class code, and so forth.

Also, the image signal processing device 100 further comprises a data generating unit 104. The data generating unit 104 generates one or multiple pieces of pixel data making up an HD signal, corresponding to the class tap extracted by the tap extracting unit 101, based on the class code obtained by the class classification unit 102 and the features obtained by the features extracting unit 103. In the case of the present embodiment, the data generation processing unit 104 generates four pieces of pixel data q1 through q4 which are adjacent in the horizontal direction (see FIG. 2).

Based on the class code and features for example, the data generation processing unit 104 performs inverse vector quantization of the class code using the data generating codebook, so as to obtain an HD code vector (q1, q2, q3, q4) having as components thereof the four pieces of pixel data q1 through q4 which make up an HD signal. As shown in FIG. 3, the data generating unit 104 comprises a codebook storage unit 104*a* and inverse vector quantization unit 104*b*, for example.

A data generating codebook obtained beforehand is stored in the codebook storage unit 104*a*. The data generating codebook is appropriation information wherein HD code vectors (Q1, Q2, Q3, Q4) serving as representative vectors for the HD signals representing each class are appropriated to the combination of class code and features, as shown in FIG. 5. In the example shown in FIG. 5, the HD code #C is the class code corresponding to the HD code vector (Q1, Q2, Q3, Q4).

The data generating codebook shown in FIG. 5 is an example wherein the features is the dynamic range DR. Also, in this example, the features are divided into two or three as to each SD code #c, but it should be noted that the dividing thereof is not restricted to this arrangement. An arrangement may also be made wherein the features are set at the finest level, coupled in the event that the corresponding HD code vectors (Q1, Q2, Q3, Q4) are the same, and defined as the number which ultimately could not be coupled.

With the present embodiment, the HD code vector (q1, q2, q3, q4) to be obtained by inverse vector quantization is a four-dimensional vector, so the HD code vector (Q1, Q2, Q3, Q4) is also a four-dimensional vector. How to generate the data generating codebook will be described later.

The vector quantization unit 104*b* obtains the HD code vector (Q1, Q2, Q3, Q4) appropriated to the combination of class code obtained by the class classification unit 102 and the features obtained by the features obtaining unit 103 based on the data generating codebook stored in the codebook storage unit 104*a*, and outputs this as an HD code vector (q1, q2, q3, q4).

Next, the operations of the image signal processing device 100 shown in FIG. 1 will be described. First, SD signals are supplied to the tap extracting unit 101. The tap extracting unit 101 divides the SD signals into blocks made up of the two pixels of pixel data adjacent in the horizontal direction, and extracts the pixel data p1 and p2 contained in each block (see FIG. 2) as a class tap, for each of the blocks.

The class tap extracted at the class tap extracting unit 101 is supplied to the class classification unit 102 and the features obtaining unit 103. At the class classification unit 102, the class tap is classified into one of multiple classes based on the class tap, and a class code corresponding to the class tap is obtained. In this case, for example, a tap vector (p1, p2) having as the components thereof the pixel data p1 and p2 contained in the class tap is subjected to vector quantization using the class classification codebook, thereby yielding a class code corresponding to the class tap.

Also, at the features extracting unit 103, the features relating to this class tap, the dynamic range DR of the pixel data within the class tap for example, are obtained based on the class tap.

The class code obtained at the class classification unit 102 and the features obtained at the features obtaining unit 103 are supplied to the data generating unit 104. At the data generating unit 104, four pieces of pixel data q1 through q4 making up HD signals (see FIG. 2) corresponding to the class tap extracted by the tap extracting unit 101 are generated based on the class code and features.

In this case, the class code is subjected to inverse vector quantization using the data generating codebook, based on the class code and features for example, thereby yielding an HD code vector (q1, q2, q3, q4) having as the components thereof the four pieces of pixel data q1 through q4 making up the HD signal.

Thus, with the image signal processing device 100 shown in FIG. 1, at the time of converting SD signals into HD signals, for each block made up of two pieces of pixel data p1 and p2 obtained by dividing SD signals, four pieces of pixel data q1 through q4 making up HD signals are generated based on the class code of the class tap made up of pixel data contained in the blocks, and the class code, so conversion processing can be performed on a more suitable manner as compared with a case of being based only on class code, and SD signals can be suitable converted into HD signals. The image signal processing device 100 can be applied to devices for outputting image signals, such as television receivers, image signal reproducing devices, and so forth.

Next, the class classification codebook stored in the aforementioned codebook storage unit 102*a* and the data generating codebook stored in the codebook storage unit 104*a* will be described.

Figure 6:
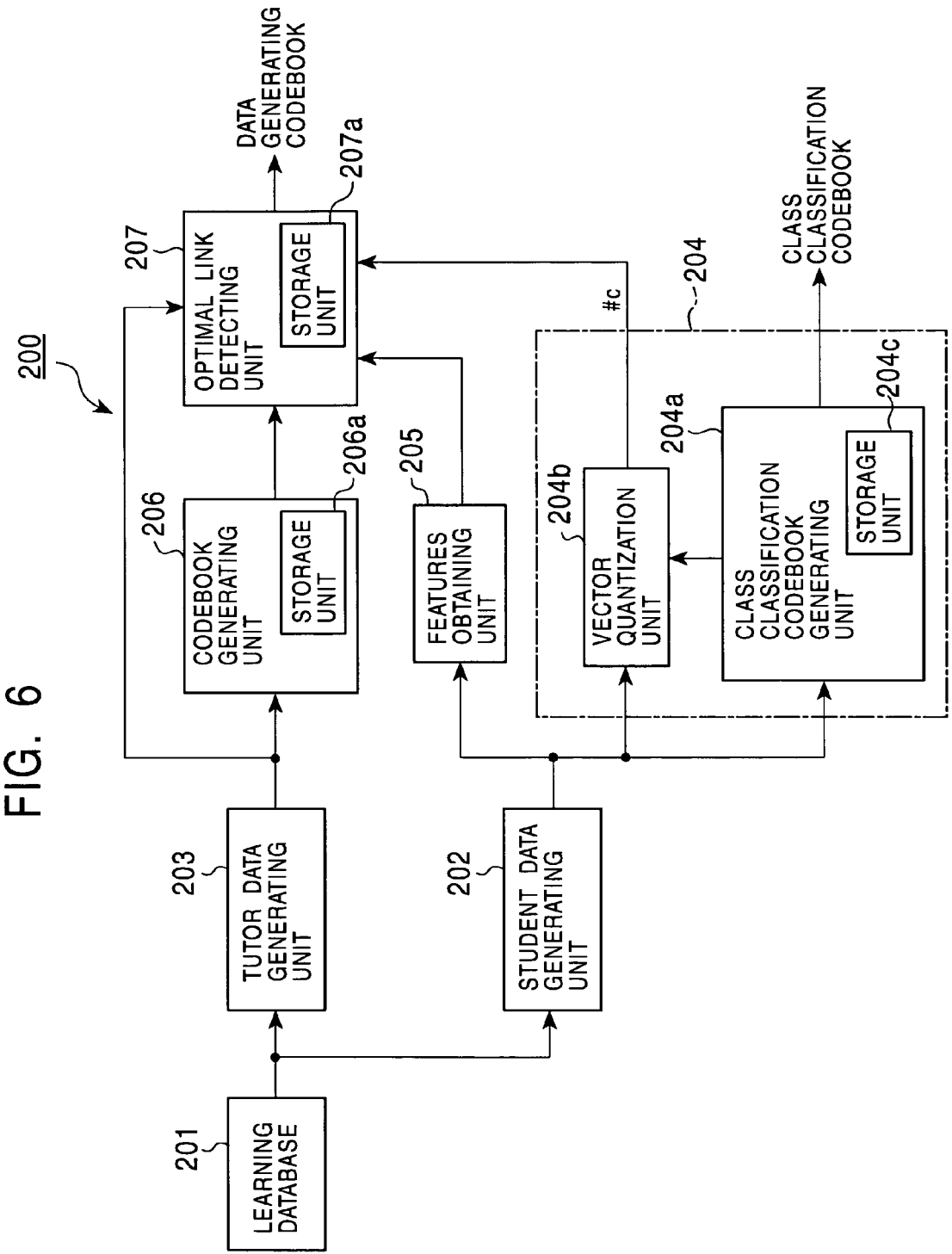
FIG. 6 is a block diagram illustrating the configuration of the a codebook generating device.

FIG. 6 illustrates an example of the configuration of a codebook generating device 200 for generating the class classification codebook and data generating codebook. The codebook generating device 200 has a learning database 201 which stores learning image signals serving as tutor signals corresponding to the HD signals.

Also, the codebook generating device 200 comprises a student data generating unit 202 serving as first tap extracting means. The student data generating unit 202 thins out the pixel data number of the learning image signals (tutor signals) so as to be ½ in the horizontal direction using a thinning-out filter (low-pass filter) so as to obtain student signals corresponding to SD signals, divides the student signals into first blocks made up of two horizontally-adjacent pieces of pixel data p1 and p2)see FIG. 2), and extracts the pixel data contained in this first block as a first tap (student data), for each block.

Also, the codebook generating device 200 comprises a tutor data generating unit 203 serving as second tap extracting means. The tutor data generating unit 203 divides the learning image signals (tutor signals) into second blocks made up of horizontally-adjacent four pixels of pixel data q1 through q4 (see FIG. 2) corresponding to the first block obtained by dividing with the aforementioned student data generating unit 202, and extracts the pixel data contained in the second block as a second tap (tutor data), for each block.

Now, one first tap (student data) extracted with the student data generating unit 202, and a corresponding one second tap (tutor data) extracted with the tutor data generating unit 203, make up one learning pair. With the codebook generating device 200, a class classification codebook and a data generating codebook are generated for multiple learning pairs.

Note that while the student data generating unit 202 obtains and uses student signals corresponding to SD signals by thinning out the pixel data number of learning image signals (tutor data) so as to be ½ in the horizontal direction, an arrangement may be made wherein learning image signals are also stored in the learning database 201 as student signals corresponding to the SD signals, so as to use the learning image signals (student signals).

Also, the codebook generating device 200 has a class classification unit 204. The class classification unit 204 classifies the first tap into one of multiple classes based on the first tap extracted with the student data generating unit 202, and obtains class code corresponding to the first tap.

The class classification unit 204 performs vector quantization of the tap vector (p1, p2) having as components thereof the pixel data p1 and p2 contained in the first tap for example, using the class classification codebook, thereby obtaining the class code corresponding to the first tap. The class classification unit 204 comprises a class classification codebook generating unit 204a and vector quantization unit 204b.

The first tap extracted by the student data generating unit 202 is supplied to the class classification codebook generating unit 204a. The class classification codebook generating unit 204a generates a class classification codebook using the tap vector (p1, p2) having as the components thereof the two pieces of pixel data p1 and p2 contained in the first tap, with the LBG (Linde Buzo Gray) algorithm, for example.

The class classification codebook is stored in a storage unit 204c built into the codebook generating unit 204a, and is read out from this storage unit 204c as necessary and used. The class classification codebook is stored in the codebook storage unit 102a shown in FIG. 3 described above and used, and as shown in FIG. 4, is appropriation information wherein SD code vectors (P1, P2) serving as representative vectors for the SD signals representing each class have appropriated thereto class code (SD code) #c indicating the corresponding class, for each of the multiple classes.

The vector quantization unit 204b is configured in the same way as the vector quantization unit 102b in FIG. 3 described above, and obtains the distance between the above-described tap vectors (p1, p2) and the SD code vectors of multiple classes (P1, P2), based on the class classification codebook stored in the storage unit 204c of the codebook generating unit 204a, and outputs the class code #c appropriated to the SD code vector (P1, P2) which minimizes this distance.

Also, the codebook generating unit 200 comprises a features obtaining unit 205. The features obtaining unit 205 is configured in the same way as the features obtaining unit 103 shown in FIGS. 1 and 3 described above, and obtains the features relating to the first tap, based on the first tap which is extracted with the student data generating unit 202. The features are, for example, the dynamic range DR of pixel data within the class tap, or the like.

Also, the codebook generating device 200 comprises a codebook generating unit 206. The codebook generating unit 206 is supplied with the second tap extracted by the tutor data generating unit 203. The codebook generating unit 206 generates a codebook relating to the HD signals using the tap vector (q1, q2, q3, q4) having as components thereof the four pieces of pixel data q1 through q4 contained in the second tap, with the LBG algorithm, for example.

Figures 7, 8:
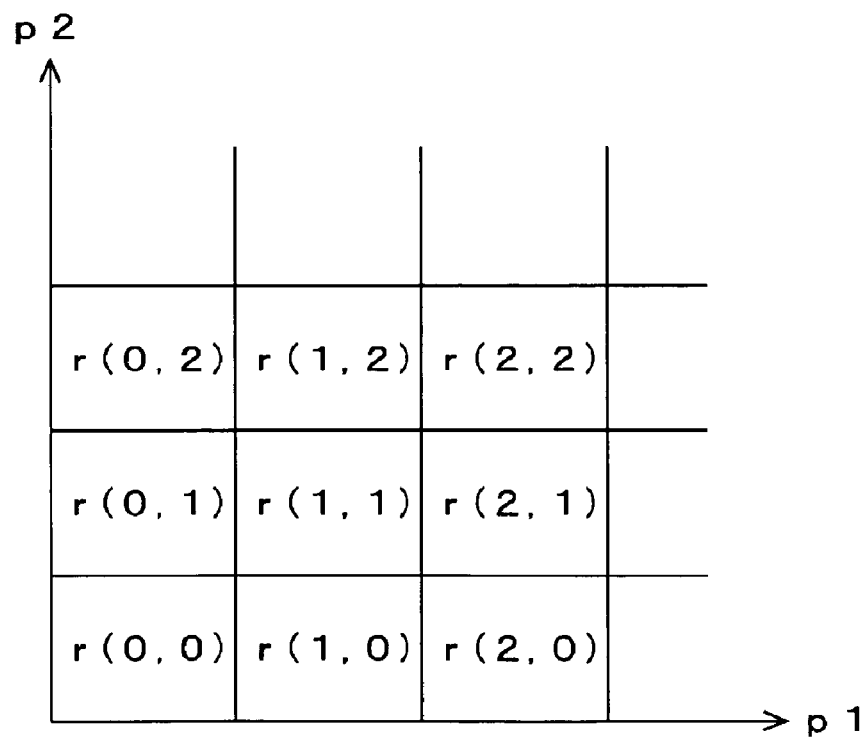
FIG. 7 is a diagram illustrating an example of codebook relating to HD signals.
FIG. 8 is a diagram for describing another example of creating a codebook.

The codebook is appropriation information wherein HD code vectors (Q1, Q2, Q3, Q4) serving as representative vectors for the HD signals representing each class have appropriated thereto class code (HD code) #C indicating the corresponding class, for each of the multiple classes, as shown in FIG. 7. This codebook is equivalent to the class classification codebook for HD signals. This codebook is stored in a storage unit 206a built into the codebook generating unit 206, and is read out from the storage unit 206a and used as necessary.

Further, the codebook generating device 200 comprises an optimal link detecting unit 207 serving as codebook generating means. The optimal link detecting unit 207 generates a data generating codebook wherein one HD code vector (Q1, Q2, Q3, Q4) selected from multiple HD code vectors (Q1, Q2, Q3, Q4) is appropriated to each combination of class code and features, based on the class code obtained form the class classification unit 204, the features obtained by the features obtaining unit 205, the second tap extracted by the tutor data generating unit 203, and the codebook generated by the codebook generating unit 206.

The data generating codebook generated by the optimal link detecting unit 207 is stored in a storage unit 207a built into the optimal link detecting unit 207, and is read out from the storage unit 207a and used as necessary. The data generating codebook is stored in the is stored in the codebook storage unit 104a shown in FIG. 3 described above and used, and is appropriation information wherein HD code vectors (Q1, Q2, Q3, Q4) serving as representative vectors for the HD signals are appropriated to combinations of class code and features, as shown in FIG. 5.

In this case, the optimal link detecting unit 207 specifically performs the following processing. For each combination of class code and features, the error (e.g., the sum of squared differences calculated by adding the squared difference for each pixel data) between the components Q1 through Q4 of the HD code vector (Q1, Q2, Q3, Q4) and the pixel data q1 through q4 contained in the second tap, for each of the multiple second taps corresponding to the multiple first taps yielding the class code and features for a combination of class code and features, is obtained, adding the multiple errors obtained to obtain the sum of errors is repeated by a number of times corresponding to the multiple HD code vectors, and the HD code vector (Q1, Q2, Q3, Q4) wherein the sum of errors is minimal is appropriated to that combination.

Now, let us say that M first taps for a certain combination exist, and the pixel data contained in the second tap corresponding to the m'th first tap is represented as $q1(m)$ through $q4(m)$. In this case, the sum of errors corresponding to the one HD code vector (Q1, Q2, Q3, Q4) is represented by Expression (1), for example, wherein Σ represents the summation of m from 1 to M.

$$\text{Sum of Errors} = \Sigma\{(q1(m)-Q1)^2 + (q2(m)-Q2)^2 + (q3(m)-Q3)^2 + (q4(m)-Q4)^2\} \quad (1)$$

Next, the operations of the codebook generating device 200 shown in FIG. 6 will be described. Learning image signals serving as tutor signals corresponding to the HD signals stored in the learning database 201 are supplied to the student data generating unit 202. At the student data generating unit 202, the first tap is extracted based on the learning image signals (tutor signals).

That is to say, the pixel data number of the learning image signals is thinned out to ½ in the horizontal direction using a thinning-out filter, thereby obtaining student signals corresponding to the SD signals, and further, the student signal is divided into first blocks made up of two pieces of horizontally-adjacent pixel data p1 and p2 (see FIG. 2), and the pixel data contained in the first block is extracted as the first tap (student data) for each block.

Also, learning image signals serving as tutor signals corresponding to the HD signals stored in the learning database 201 are supplied to the tutor data generating unit 203. At the tutor data generating unit 203, the second tap is extracted based on the learning image signals (tutor signals). That is to say, the learning image signals (tutor signals) are divided into second blocks made up of the horizontally-adjacent four pieces of pixel data q1 through q4 (see FIG. 2) corresponding to the first block obtained by dividing with the student data generating unit 202 described above, and the pixel data contained in the second block is extracted as the second tap (tutor data), for each block.

The first tap extracted by the student data generating unit 202 is supplied to the class classification codebook generating unit 204a making up the class classification unit 204. At the codebook generating unit 204a, a class classification codebook (see FIG. 4) is generated using the tap vector (p1, p2) having as the components thereof the two pieces of pixel data p1 and p2 contained in the first tap, with the LBG algorithm, for example.

The class classification codebook is stored in the codebook storage unit 102a shown in FIG. 3 described above, and used. The class classification codebook is stored in the storage unit 204c built into the codebook generating unit 204a, and read out from this storage unit 204c and used as necessary.

Also, the second tap extracted with the tutor data generating unit 203 is supplied to the codebook generating unit 206. The codebook generating unit 206 generates codebook (see FIG. 7) using the tap vector (q1, q2, q3, q4) having as the components thereof the four pieces of pixel data q1 through q4 contained in the second tap, with the LBG algorithm for example. This codebook is stored in the storage unit 206a built into the codebook generating unit 206, and read out from this storage unit 206a and used as necessary.

Also, the first tap extracted with the student data generating unit 202 is supplied to the vector quantization unit 204b making up the class classification unit 204. At the class classification unit 204, the first tap is classified into one of multiple classes based on the first tap, yielding class code corresponding to the first tap. That is to say, the tap vector (p1, p2) having as the components thereof the pixel data p1 and p2 contained in the first tap is subjected to vector quantization using the class classification codebook stored in the storage unit 204c of the codebook generating unit 204a, thereby obtaining the class code corresponding to the first tap.

Also, the first tap extracted at the student data generating unit 202 is supplied to the features obtaining unit 205. At the features obtaining until 205, the features relating to the first tap, e.g., the dynamic range DR of the pixel data within the first tap, is obtained based on the first tap.

The class code obtained by the vector quantization unit 204b and the features obtained by the features obtaining unit 205 are supplied to the optimal link detecting unit 207. Also supplied to the optimal link detecting unit 207 is the second tap extracted by the tutor data generating unit 203 and the codebook stored in the storage unit 206a of the codebook generating unit 206.

At the optimal link detecting unit 207, a data generating codebook (see FIG. 5) is generated wherein one HD code vector (Q1, Q2, Q3, Q4) selected from multiple HD code vectors (Q1, Q2, Q3, Q4) is appropriated to each combination of class code and features, based on the class code, features, second tap, and codebook.

In this case, for each combination of class code and features, the error between the components Q1 through Q4 of the HD code vector (Q1, Q2, Q3, Q4) and the pixel data q1 through q4 contained in the second tap corresponding to the first tap for that combination, is obtained, the multiple errors obtained are added to obtain the sum of errors (see Expression (1)), this is repeated by a number of times corresponding to the multiple HD code vectors, and the HD code vector (Q1, Q2, Q3, Q4) wherein the sum of errors is minimal is appropriated to that combination.

This data generating codebook is stored in the codebook storage unit 104a in FIG. 3 described above and used. The data generating codebook is stored in the storage unit 207a built into the codebook generating unit 207, and read out from this storage unit 207a and used as necessary.

Thus according to the codebook generating device 200 shown in FIG. 6, the class classification codebook and data generating codebook used by the image signal processing device 100 shown in FIG. 1 can be suitably generated.

Note that the codebook generating device 200 shown in FIG. 6 has been described as generating codebooks at the class classification codebook generating unit 204a of the class classification unit 204 and the codebook generating unit 206 with the LBG algorithm for example, by an arrangement may be made wherein the codebook is generated by means other than means used for codebook generating used with vector quantization.

That is to say, the class classification codebook may be generated as shown in FIG. 8, for example. Here, in FIG. 8, two-dimensional space representing the two pieces of pixel data p1 and p2 contained in the first tap (SD image space) is sectioned as a grid, thereby forming rectangular regions r(i, j). Note that in FIG. 8, the pixel values of the pixel data p1 and p2 are represented by the horizontal and vertical axes, respectively.

As described earlier, the pixel data p1 and p2 is 8-bit data with the present embodiment, so the values which can be assumed on the horizontal and vertical axes of the SD image space are 0 through 255 (i.e., $2^8-1$). Also, in FIG. 8, r(i, j) represents a region the i'th from the left and the j'th from the bottom in the SD image space, and a unique class code #c representing the class is appropriated to each region r(i, j).

The class classification codebook generating unit 204a obtains the first tap contained in the region r(i, j) for each region r(i, j), and further obtains the center of gravity of the first tap, for example. That is to say, in a case wherein there are K first taps contained in a region r(i, j), and the k'th first tap is represented as $(p_{1,r(i,j)}(k), p_{2,r(i,j)}(k))$ the class classification codebook generating unit 204a obtains the center of gravity of the first tap of the class code #c which has been appropriated to the region r(i, j), represented by $(\Sigma p_{1,r(i,j)}(k)/K, \Sigma p_{2,r(i,j)}(k)/K)$. Here, $\Sigma$ represents the summation of k from 1 to K.

The class classification codebook generating unit 204a then correlates the center of gravity of the first tap with the class code #c with the class code #c, as a SD code vector (P1, P2) regarding SD signals, representing the class known by the class code #c. This generates the class classification codebook such as shown in FIG. 4.

Also, though detailed description will be omitted, the codebook generated by the codebook generating unit 206 (see FIG. 7) can also be generated in the same way as the class classification codebook described above.

In that case, four-dimensional space (HD image space) representing the four pieces of pixel data q1 through q4 contained in the second tap is sectioned as a grid, thereby forming regions r(i, j, s, t). In this case, r(i, j, s, t) represents a region the i'th on the axis of the pixel value of the image data q1, the j'th on the axis of the pixel value of the image data q2, the s'th on the axis of the pixel value of the image data q3, and the t'th on the axis of the pixel value of the image data q4 in HD image space, and a unique class code #C representing the class is appropriated to each region r(i, j, s, t).

The codebook generating unit 206 obtains the second tap contained in the regions r(i, j, s, t), and obtains the center of gravity of the second tap thereof. The codebook generating unit 206 correlates the center of gravity of the second tap of the class code #C to the class code #C, as an HD code vector (Q1, Q2, Q3, Q4) regarding HD signals, representing the class indicated by the class code #C. Thus, a codebook such as shown in FIG. 7 is generated.

Figure 9:
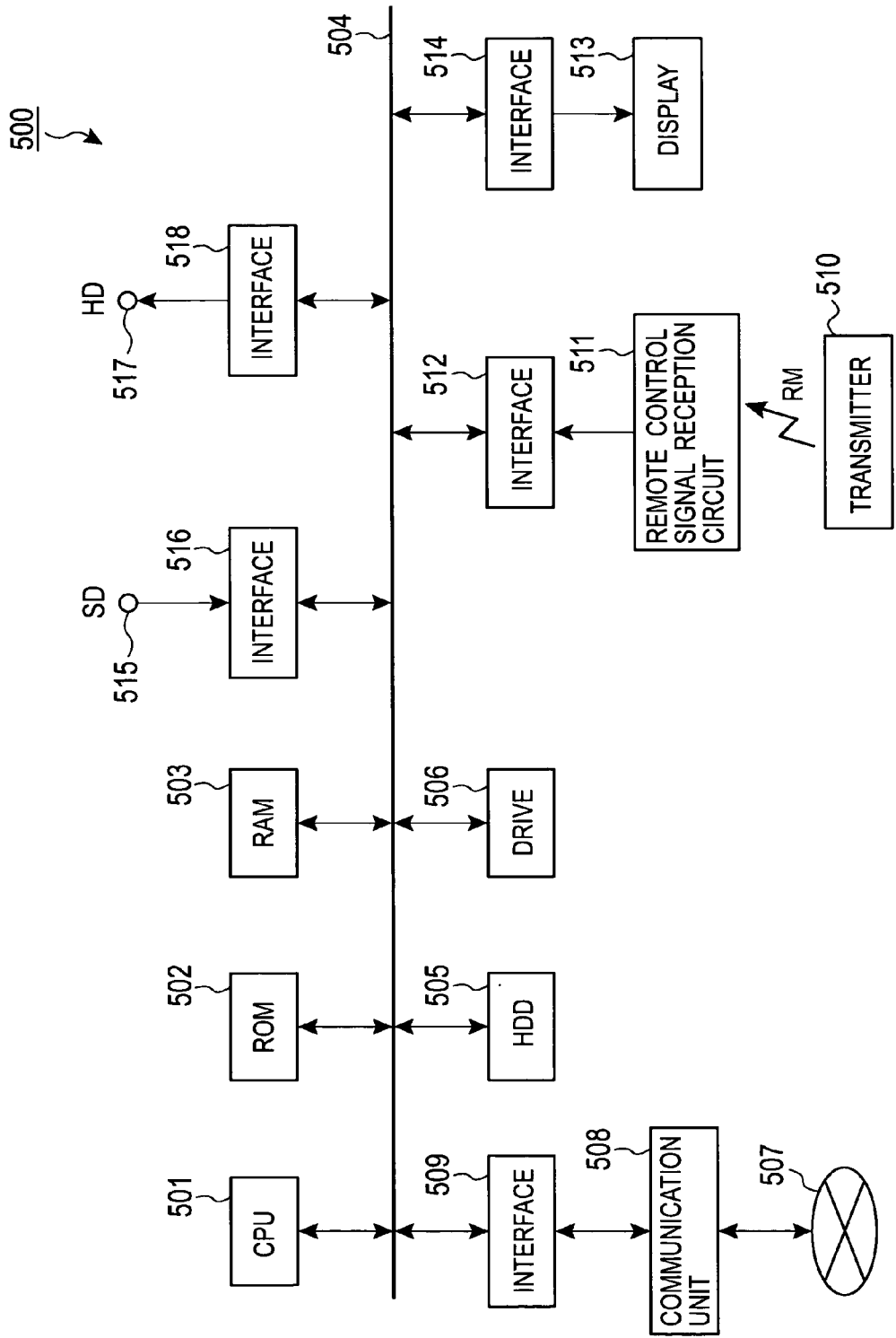
FIG. 9 is a block diagram illustrating the configuration of an image signal processing device for realizing image signal processing with software.

Also note that the processing of the image signal processing device 100 in FIG. 1 described above can be performed by software on an image signal processing device (computer) 500 such as shown in FIG. 9, for example.

First, the image signal processing device 500 shown in FIG. 9 will be described. The image signal processing device 500 comprises a CPU 501 for controlling the operation of the entire device, ROM (Read-Only Memory) 502 storing the control programs for the CPU 501, codebooks, etc., and RAM (Random Access Memory) 503 making up a work region for the CPU 501. The CPU 501, ROM 502, and RAM 503 are each connected to a bus 504.

Also, the image signal processing device 500 has a hard disk drive (HDD) 505 serving as an external storage device, and a drive 506 for handling removable recording media such as diskettes, CD-ROM (Compact Disc Read-Only Memory), MO (Magneto-optical) disks, DVDs (Digital Versatile Disks), magnetic disks, semiconductor memory, or the like. The drives 505 and 506 are each connected to the bus 504.

Also, the image signal processing device 500 has a communication unit 508 for cable or wireless connection to a communication network 507 such as the Internet. The communication unit 508 is connected to the bus 504 via an interface 509.

Also, the image signal processing device 500 has a user interface unit. The user interface unit comprises a remote control signal reception circuit 511 for receiving remote control signals RM from a remote control transmitter 510, and a display 513 which is a CRT (Cathode Ray Tube), LCD (Liquid Crystal Display), or the like. The reception circuit 511 is connected to the bus 504 through an interface 512, and the display 513 is similarly connected to the bus 504 through an interface 514.

Further, the image signal processing device 500 comprises an input terminal 515 for inputting SD signals, and an output terminal 517 for outputting HD signals. The input terminal 515 is connected to the bus 504 via an interface 516, and in the same way, the output terminal 517 is connected to the bus 504 via an interface 518.

Now, an arrangement may be made wherein, instead of storing the control programs and codebooks and the like in the ROM 502 beforehand, these are downloaded from a communication network 507 such as the Internet for example via the communication unit 508, and stored in the hard disk drive 505 or the RAM 503 for use, for example. Also, the control programs, codebooks, etc., may be provided as removable recording media. Also, instead of inputting the SD signals to be processed via the input terminal 515, the SD signals may be supplied by a removable recording media, or downloaded via the communication unit from the communication network 507 such as the Internet. Also, arrangements may be made wherein instead of or in conjunction with outputting the post-processing HD signals to the output terminal 517, the HD signals are supplied to the display 513 for display, stored in the hard disk drive 505, and/or send to the communication network 507 such as the Internet via the communication unit 508, and so forth.

The processing procedures for obtaining HD signals from SD signal with the image signal processing device 500 shown in FIG. 9 will be described with reference to the flowchart shown in FIG. 10.

First, in step ST11, the processing is started, and in step ST12, one frame or one field of SD signals are output to the device from the input terminal 515, for example. The SD signals input thus are temporarily stored in the RAM 503.

Next, in step ST13, determination is made regarding whether or not all frames or all fields of the SD signals have been processed. In the event that the processing has ended, the processing ends in step ST14. On the other hand, in the event that the processing has not ended, the flow proceeds to step ST15.

In step ST15, the SD signal is divided into blocks made up of two pieces of horizontally-adjacent pixel data, and the pixel data p1 and p2 (see FIG. 2) contained in the block is extracted as the class tap thereof, for each block.

In step ST16, the class tap is classified into one of multiple classes based on the class tap, and the class code thereof is obtained. In this case, the tap vector (p1, p2) having as the components thereof the pixel data p1 and p2 contained in the class tap is subjected to vector quantization using the class classification codebook (see FIG. 4) stored in the ROM 502, and the class code corresponding to the class tap is obtained.

Next, in step ST17, the features relating to this class tap, e.g., the dynamic range DR of the pixel data p1 and p2 within the class tap, is obtained based on the class tap.

Next, in step ST18, four pieces of pixel data q1 through q4 (see FIG. 2) masking up the HD signals, corresponding to the class tap extracted in step ST15, are generated, based on the class code obtained in step ST16 and the features obtained in step ST17. In this case, the class code is subjected to inverse vector quantization using the data generating codebook (see FIG. 5) stored in the ROM 502, based on the class code and features, thereby obtaining the HD code vector (q1, q2, q3, q4) having as the components thereof the four pixels of pixel data q1 through q4 making up the HD signals.

Next, in step ST19, determination is made regarding whether or not processing for obtaining HD signal pixel data has ended for all regions of the SD signal pixel data for the one frame or one field input in step ST12. In the event that this has ended, the flow returns to step ST12 and the flow proceeds to input processing of the SD signals for the next one frame or one field. On the other hand, in the event that the processing has not ended yet, the flow returns to step ST15, and processing of the next class tap begins.

Figure 10:
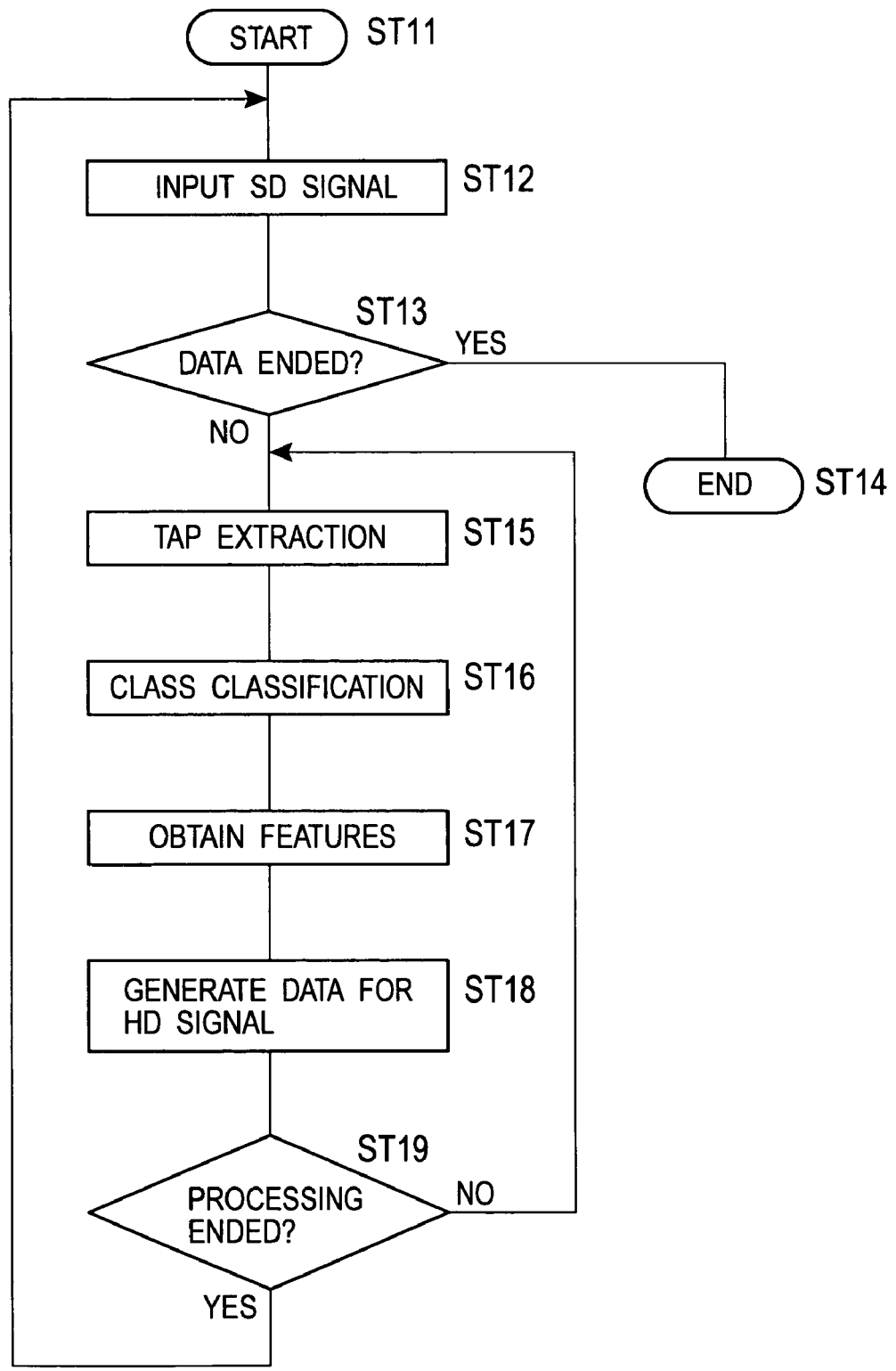
FIG. 10 is a flowchart illustrating image signal processing.

Thus, HD signal pixel data can be obtained by processing input SD signal pixel data, by means of performing processing following the flowchart shown in FIG. 10. The HD signals obtained by this processing is output to the output terminal 517, supplied to the display 513 and displayed as an image, and/or supplied to and recorded in the hard disk drive 505.

Also, though omitted from the drawings, processing of the codebook generating device 200 shown in FIG. 6 can also being performed by software.

Now, the processing procedures for generating the class classification codebook and data generating codebook will be described with reference to the flowchart shown in FIG. 11.

First, processing is started in step ST21, and in step ST22 one frame or one field of tutor signals corresponding to HD signals are input. In step ST23, student signals corresponding to SD signals are generated from the tutor signal input in step ST22. In this case, the pixel data number of the tutor signal corresponding to the HD signals is thinned out to ½ in the horizontal direction, thereby generating student signals corresponding to the SD signals.

Next, in step ST24, the first tap (student data) is extracted based on the student signals generated in step ST23. In this case, the student signals are divided into first blocks made up of two horizontally-adjacent pieces of pixel data p1 and p2, and the pixel data contained in the first block is extracted as the first tap, for each of the blocks.

Next, in step ST25, the second tap (tutor data) is extracted based on the tutor signals input in step ST22. In this case, the tutor signals are divided into second blocks made up of four horizontally-adjacent pieces of pixel data q1 through q4 (see FIG. 2) corresponding to the first block obtained by the dividing in step ST24, and the pixel data contained in the second block is extracted as the second tap, for each of the blocks.

The processing in steps ST24 and ST25 generates multiple pairs of learning data from the tutor signals and student signals of the one frame or one field. Note that one piece of learning data is made up of one first tap (student data) and one second tap (tutor data).

Next, in step ST26, determination is made regarding whether or not processing of tutor signals has ended for all frames or all fields. In the event that the processing has not ended, the flow returns to step ST22, the next frame or field of tutor signals are input, and then the processing described above is repeated. On the other hand, in the event that processing has ended, the flow proceeds to step ST27.

In step ST27, the class classification codebook is generated. In this case, the class classification codebook is generated with the LBG algorithm for example, based on multiple first taps (student data) making up multiple pairs of learning data generated in the processing in steps ST22 through ST26, using the tap vector (p1, p2) having as the components thereof the two pieces of pixel data p1 and p2 contained in the first tap.

This class classification codebook is information wherein SD code vectors (P1, P2) serving as representative vectors for the SD signals representing each class have appropriated thereto class code (SD code) #c indicating the corresponding class, for each of the multiple classes, as shown in FIG. 4.

Next, in step ST28, the codebook relating to the HD signals is generated. In this case, the codebook is generated with the LBG algorithm for example, based on multiple second taps (tutor data) making up multiple pairs of learning data generated in the processing in steps ST22 through ST26, using the tap vector (q1, q2, q3, q4) having as the components thereof the four pieces of pixel data p1 through p4 contained in the second tap.

This class code is information wherein HD code vectors (Q1, Q2, Q3, Q4) serving as representative vectors for the HD signals representing each class have appropriated thereto class code (HD code) #C indicating the corresponding class, for each of the multiple classes, as shown in FIG. 7.

Next, in step ST29, based on the multiple first taps (student data) making up the multiple pairs of learning data generated in steps ST22 through ST26, the first taps are each classified into multiple classes, and the class code corresponding to each first tap is obtained.

In this case, the tap vector (p1, p2) which has as the components thereof the pixel data p1 and p2 contained in the first tap is subjected to vector quantization using the class classification codebook generated in step ST27, thereby obtaining the class code #c corresponding to the first tap.

Next, in step ST30, features relating to each of the first taps, e.g., the dynamic range of pixel data within a first tap, is obtained based on multiple first taps (student data) making up the multiple pairs of learning data generated in steps ST22 through ST26.

Next, in step ST31, a data generating codebook is generated based on the multiple pairs of learning data generated in steps ST22 through ST26, the codebook generated in step ST28 (see FIG. 7), the class code #c and features #a corresponding to each first tap (student data) making up the multiple pairs of learning data generated in steps ST29 and ST30, and the processing ends in step S32.

Now, the features #a indicates the sectioning range number in the finest sectioning of the features obtained in step ST30. For example, in the event of the features being the dynamic range DR, the dynamic range DR in a range of 0 to 255, and the finest sectioning being each "1", there are 256 sectioning ranges, and accordingly the features #a ranges from 0 to 255.

The data generating codebook is appropriation information wherein one HD code vector (Q1, Q2, Q3, Q4) selected from multiple HD code vectors (Q1, Q2, Q3, Q4) registered in the codebook (see FIG. 7) generated in step ST28 is appropriated to each combination of class code #c and features #a, as shown in FIG. 5.

In the processing in step ST31, the error between the pixel data q1 through q4 contained in the second tap and the components Q1 through Q4 of the HD code vector (Q1, Q2, Q3, Q4) is obtained regarding each of the multiple second taps corresponding to the multiple first taps, for each of the combinations of class code #c and features #a, and the sum of errors is obtained by adding the multiple errors obtained thus (see Expression (1)), which is repeated by a number of times which is equal to the number of multiple HD code vectors, and the HD code vector (Q1, Q2, Q3, Q4) which minimizes the sum of errors is appropriated to the combination.

That is to say, first, in step ST41, the class code (SD code) #c is set to 0, in step ST42, the features #a is set to 0, and in step ST43, the class code (HD code) #C is set to 0.

In step ST44, the sum of errors corresponding to the set class code #C is obtained for the combination of the set class code #c and the features #a. In this case, the error between the pixel data q1 through q4 contained in the second tap and the components Q1 through Q4 of the HD code vector (Q1, Q2, Q3, Q4) corresponding to the set class code #C is obtained regarding each of the multiple second taps corresponding to the multiple first taps, for each of the set combinations of class code #c and features #a, and the sum of errors is obtained by adding the obtained multiple errors.

Next, in step ST45, determination is made regarding whether or not the processing for calculating the sum of errors for all class codes (HD code) #C for the combinations of set class code #c and features #a has ended. In the event that this has not ended, the flow increments the class code #C in step ST46, then returns to step ST44, and begins the processing for obtaining the sum of errors for the next class code (HD code) #C for the combination of set class code #c and features #a. On the other hand, in the event that the processing has ended, the flow proceeds to step ST47.

In step ST47, determination is made regarding whether the processing for calculating the sum of errors for all class codes (HD code) #C for the combinations of set class code (SD code) #c and all features #a has ended. In the event that this has not ended, the flow increments the features #a in step ST48, then returns to step ST43, and begins the processing for obtaining the sum of errors for all class codes (HD code) #C for the combination the set class code (SD code) #c and the next features #a. On the other hand, in the event that the processing has ended, the flow proceeds to step ST49.

In step ST49, determination is made regarding whether the processing for calculating the sum of errors for all class codes (HD code) #C for the combinations of all class codes (SD code) #c and all features #a has ended. In the event that this has not ended, the flow increments the class code #c in step ST50, then returns to step ST42, and begins the processing for obtaining the sum of errors for all class codes (HD code) #C for the combination the next class code (SD code) #c with all next features #a. On the other hand, in the event that the processing has ended, the flow proceeds to step ST51.

In the event that determination is made in step ST49 that the processing has ended, the sum of errors for all class codes (HD code) #C for each of the combinations of class code (SD code) #c and features #a is obtained. The HD code vector (Q1, Q2, Q3, Q4) corresponding to the class code #C which minimizes the sum of errors is calculated for each combination of class code #c and features #a, and this is appropriated to the combination, thus compiling a data generating codebook (see FIG. 5).

Figure 11:
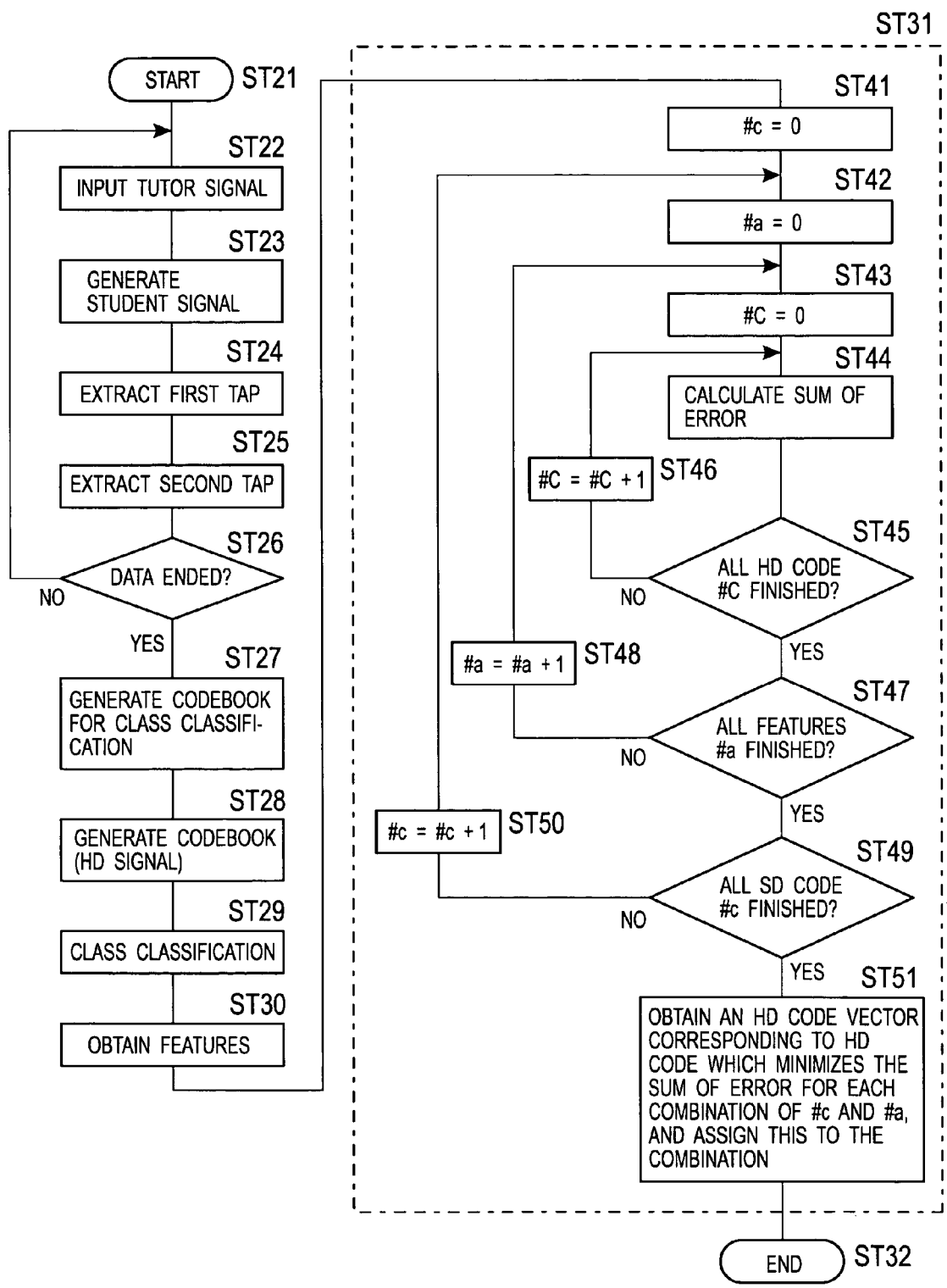
FIG. 11 is a flowchart illustrating codebook generating processing.

Thus, the class classification codebook and data generating codebook can be generated with procedures the same as those of the codebook generating device 200 shown in FIG. 6, by performing processing according to the flowchart shown in FIG. 11.

Note that with the image signal processing device 100 shown in FIG. 1, SD signals are divided into blocks made up of two pieces of horizontally-adjacent pixel data, the pixel data p1 and p2 (see FIG. 2) contained in each block is extracted as the class tap thereof, for each block, and four pieces of horizontally-adjacent pixel data q1 through q4 making up an HD signal are generated for each of the class taps, but it should be noted that the number and arrangements of the pixel data of the class taps and of the HD signals generated corresponding to the class taps are by no means restricted to this. That is to say, the number of pieces of pixel data contained in the class taps is not restricted to two, and further, the pixels do not need to be horizontally adjacent. Also, the number of pieces of pixel data of the HD signals generated corresponding to the class taps is not restricted to four, and further, the pixels do not need to be horizontally adjacent.

Also, while an arrangement has been illustrated for the image signal processing device 100 shown in FIG. 1 wherein a tap vector (p1, p2) having as the components thereof the pixel data p1 and p2 contained in the class tap is subjected to vector quantization using the class classification codebook, thereby obtaining class code corresponding to the class tap, the process of obtaining class code corresponding to class taps is not restricted to this. That is to say, the class classification can be obtained by subjecting the pixel data itself making up the class tap, or data obtained by processing pixel data such as the difference value between adjacent pieces of pixel data, to the above-described ADRC processing or the like. In this case, the class classification unit 204 in the codebook generating device 200 shown in FIG. 6 is also of the same configuration.

Also, while an arrangement has been illustrated for the image signal processing device 100 shown in FIG. 1 wherein, based on class code and features, the class code is subjected to inverse vector quantization using the data generating codebook, so as to obtain an HD code vector (q1, q2, q3, q4) having as the components thereof four pieces of pixel data q1 through q4 making up the HD signal, the process for generating pixel data making up HD signals corresponding to the class code and features is not restricted to this. For example, pixel data making up the HD signals can be calculated from the class code and features with a predetermined relational expression, for example. In this case, the predetermined relational expression can be generated beforehand by learning.

Also, while an arrangement has been illustrated for the image signal processing device 100 shown in FIG. 1 wherein SD signals are converted into HD signals which have twice the number of pixels in the horizontal direction, but the direction for increasing the number of pixels is not restricted to the horizontal direction, and arrangements can be conceived for increasing in the vertical direction, or further in the time direction (frame direction). Also, the present invention can be equally applied to arrangements for obtaining SD signals by reducing the number of pixels from HD signals. That is to say, the present invention can be generally applied to cases of converting first image signals into second image signals which have the same or different number of pixels as those of the first image signals.

Also, while the present embodiment has illustrated the information signals made up of multiple pieces of image data being image signals made up of multiple pieces of information data, the present invention is equally applicable to other types of information signals, such as audio signals for example. In the case of audio signals, the multiple pieces of image data would be multiple pieces of audio sample data.

Thus, according to the present invention, at the time of converting first information signals made up of a plurality of pieces of information data into second information signals made up of a plurality of pieces of information data, one or a plurality of pieces of information data making up the second information signals are generated for each block comprising one or a plurality of pieces of information data obtained by dividing the first information signals, based on the class code of and features of class taps made up of information data contained in the blocks, whereby the first information signals can be suitably converted into second information signals.

Second Embodiment

Figure 12:
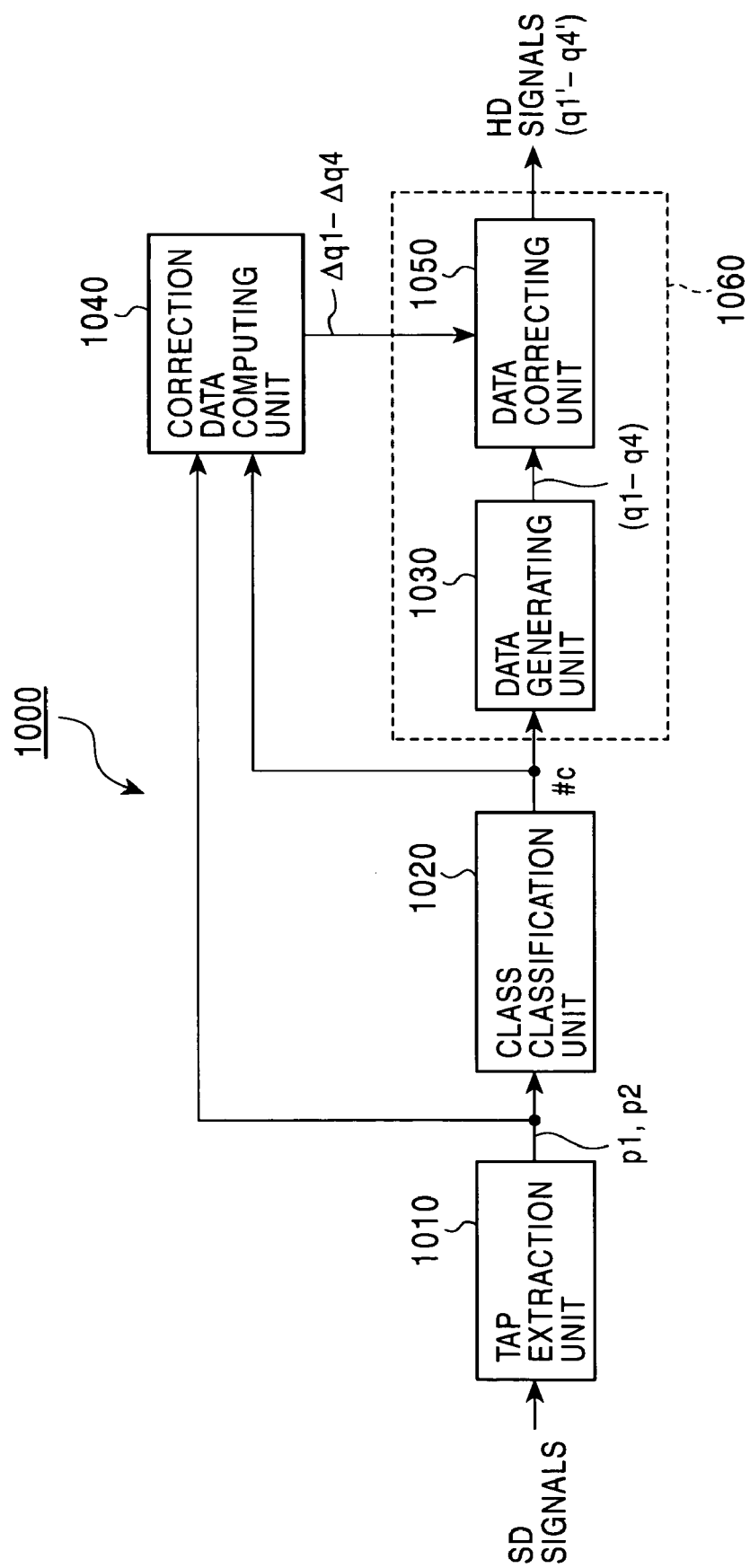
FIG. 12 is a block diagram illustrating the configuration of an image processing device.

A second embodiment of the present invention will be describe with reference to the drawings. FIG. 12 illustrates the configuration of an image signal processing device 1000. The image signal processing device 1000 converts SD signals into HD signals. The positional relation between the SD signals and HD signals is as shown in FIG. 2.

In FIG. 12, the image signal processing device 1000 comprises a tap extracting unit 1010, and a data processing unit 1060 comprises a data generating unit 1030 and data correction unit 1050. This tap extracting unit 1010 receives supply of SD signals to be converted. The SD signals are made up of multiple pieces of 8-bit pixel data. The tap extracting unit 1010 divides the SD signals into blocks made up of one or multiple pieces of pixel data. In the present embodiment, a block is made up of two pieces of pixel data, p1 and p2, adjacent in the horizontal direction (FIG. 2), and the pixel data p1 and p2 contained in the blocks is extracted as class taps.

Also, the image signal processing unit 1000 has a class classification unit 1020. The class classification unit 1020 classifies each class tap into one of multiple classes based on the class tap extracted by the tap extracting unit 1010, and obtains a class code #c corresponding to the class tap. The class classification unit 1020 subjects a tap vector (p1, p2) having as components thereof the pixel data p1 and p2 contained in the class tap, to vector quantization using a class classification codebook, and obtains a class code #c corresponding to the class tap. The class classification unit 1020 comprises a codebook storage unit 1020a and a vector quantization unit 1020b as shown in FIG. 13.

A class classification codebook obtained beforehand is stored in the codebook storage unit 1020a. The class classification codebook is appropriation information wherein SD code vectors (P1, P2) serving as representative vectors for the SD signals representing each class have appropriated thereto class code (SD code) #c indicating the corresponding class, for each of the multiple classes, as shown in FIG. 4.

With the present embodiment, the tap vectors (p1, p2) to be subjected to vector quantization are two-dimensional vectors, so the SD code vectors (P1, P2) are also two-dimensional vectors. How to generate the class classification codebook will be described later.

The vector quantization unit 1020b obtains the distance between the above-described tap vectors (p1, p2) and the SD code vectors of multiple classes (P1, P2), based on the class classification codebook stored in the codebook storage unit 1020a, and outputs the class code #c appropriated to the SD code vector (P1, P2) which minimizes this distance.

Returning to FIG. 12, the image signal processing device 1000 also comprises a data generating unit 1030. The data generating unit 1030 generates one or multiple pieces of pixel data making up an HD signal, corresponding to the class tap extracted by the tap extracting unit 1010, based on the class code #c obtained by the class classification unit 1020. In the case of the present embodiment, the data generating unit 1030 generates four pieces of pixel data q1 through q4 which are adjacent in the horizontal direction (see FIG. 2).

The data generating unit 1030 performs inverse vector quantization of the class code #c using the data generating codebook, so as to obtain an HD code vector (q1, q2, q3, q4) having as components thereof the four pieces of pixel data q1 through q1 which make up an HD signal. As shown in FIG. 3 for example, the data generating unit 1030 comprises a codebook storage unit 1030a and inverse vector quantization unit 1030b.

A data generating codebook obtained beforehand is stored in the codebook storage unit 1030a. The data generating codebook is appropriation information wherein HD code vectors (Q1, Q2, Q3, Q4) serving as representative vectors for the HD signals representing each class are appropriated to the each class code #c, as shown in FIG. 14.

With the present embodiment, the HD code vector (q1, q2, q3, q4) to be obtained by inverse vector quantization is a four-dimensional vector, so the HD code vector (Q1, Q2, Q3, Q4) is also a four-dimensional vector. How to generate the data generating codebook will be described later.

The vector quantization unit 1030b obtains the HD code vector (Q1, Q2, Q3, Q4) appropriated to the class code #c obtained by the class classification unit 1020 based on the data generating codebook stored in the codebook storage unit 1030a, and outputs this as an HD code vector (q1, q2, q3, q4).

Now, referring to the four-dimensional space expressing the HD code vector (q1, q2, q3, q4) obtained by the data generating unit 1030 as HD image space, the HD code vector (q1, q2, q3, q4) can be expressed as a vector indicating a point in the HD image space. Also, referring to the two-dimensional space expressing the tap vector (p1, p2) having as the components thereof the pixel data contained in the class tap extracted by the class tap extracting unit 1010 as SD image space, the tap vector (p1, p2) can be expressed as a vector indicating a point in the SD image space.

Figure 15A:
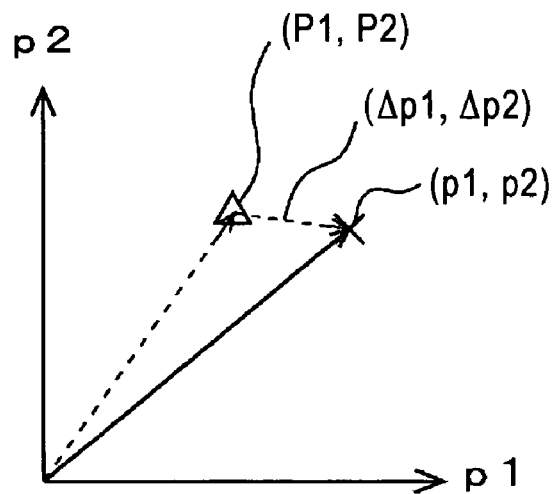
FIG. 15A is a diagram illustrating SD image space.

With the vector quantization unit 1020b of the class classification unit 1020 shown in FIG. 13, an SD code vector (P1, P2) wherein the distance to the tap vector (p1, p2) is minimal is detected in the SD image space, and the class code #c of the SD code vector (P1, P2) is output, as shown in FIG. 15A.

Figure 15B:
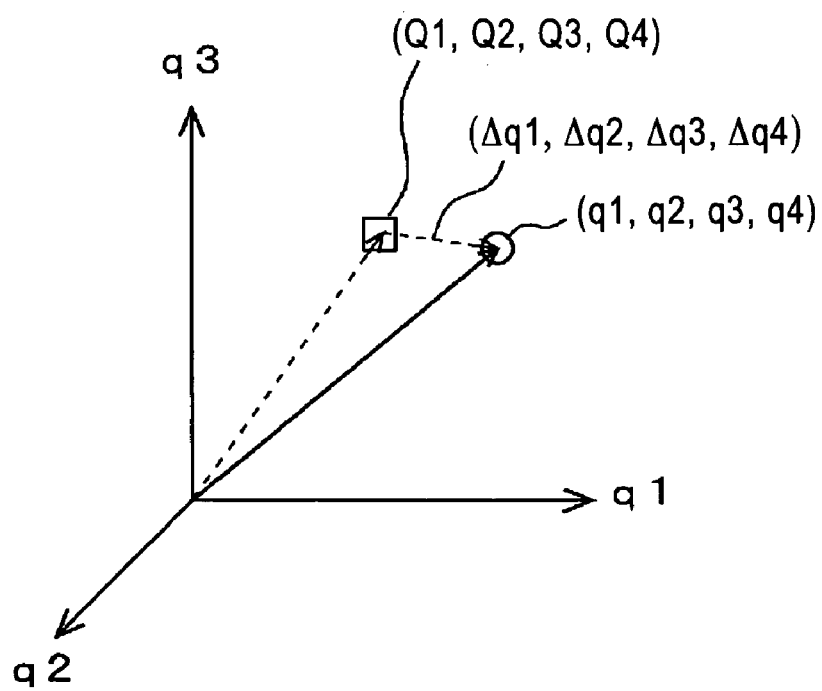
FIG. 15B is a diagram illustrating HD image space.

Also, with the inverse vector quantization unit 1030b of the data generating unit 1030 shown in FIG. 13, the HD code vector (Q1, Q2, Q3, Q4) of the class code #c in the HD image space is obtained as shown in FIG. 15B, and the components Q1, Q2, Q3, and Q4 are output as four pixels of pixel data q1, q2, q3, and q4 making up the HD signals.

Now, since illustrating four-dimensional space in a drawing is difficult, FIG. 6B illustrates three-dimensional space having each of the three pieces of pixel data q1, q2, and q3, as the axes thereof, as HD image space.

In almost all cases, the SD code vector (P1, P2) in the SD image space does not agree with the tap vector (p1, p2) classified with the class code #c. This is because the SD code vector (P1, P2) is a vector representing multiple points (vectors) in the SD space, belonging to the class of the class code #c.

Also, presupposing that, with regard to the two pieces of pixel data p1 and p2 which are the components of the tap vector (p1, p2) in the SD image space, four pieces of true-value pixel data q1, q2, q3, and q4 exist for making up the HD signals corresponding to the two pieces of pixel data p1 and p2, in most cases the HD code vector (Q1, Q2, Q3, Q4) in the HD image space of the class code #c representing the class of the tap vector (p1, p2) will not agree with the true-value vector (q1, q2, q3, q4) having as the components thereof the above four pieces of true-value pixel data q1, q2, q3, and q4. This is because the HD code vector (Q1, Q2, Q3, Q4) is a vector representing multiple points (vectors) on the HD image space corresponding to a class tap belonging to the class of the class code #c.

From the above, it can be understood that the four pieces of pixel data q1 through q4 making up the HD signals, generated at the data generating unit 1030, generally do not agree with the true value, meaning that in this state the image quality is deteriorated by the HD signals.

Accordingly, the image signal processing device 1000 is of a configuration wherein the four pieces of pixel data q1 through q4 making up the HD signals obtained from the data generating unit 1030 are corrected so as to bring them closer to the true value.

In FIG. 15B, the HD code vector (Q1, Q2, Q3, Q4) corresponding to the class code #c is subtracted from a true-value vector (q1, q2, q3, q4) having as components thereof four pieces of true-value pixel data q1 through q4 making up the HD signals corresponding to the class tap classified in the class of the class code #c, thereby yielding a vector ($\Delta$q1, $\Delta$q2, $\Delta$q3, $\Delta$q4), which is referred to as an HD error vector. Note that $$\Delta q1 = q1 - Q1$$

$$\Delta q2 = q2 - Q2$$

$$\Delta q3 = q3 - Q3$$

$$\Delta q4 = q4 - Q4$$

are all true.

In this case, the HD error vector ($\Delta$q1, $\Delta$q2, $\Delta$q3, $\Delta$q4) represents the error (HD error) of the HD code vector (Q1, Q2, Q3, Q4) corresponding to the class code #c as to the true-value vector (q1, q2, q3, q4), so correcting the HD code vector (Q1, Q2, Q3, Q4) corresponding to the class code #c with correction data corresponding to the HD error vector ($\Delta$q1, $\Delta$q2, $\Delta$q3, $\Delta$q4) would enable coming close to the true-value vector (q1, q2, q3, q4). How to precisely estimate the correction data is the problem.

Now, at the class classification unit 1020, the tap vector (p1, p2) is subjected to class classification, and a class code #c indicating the class is obtained. Subtracting the SD code vector (P1, P2) corresponding to the class code #c from the tap vector (p1, p2) yields a vector ($\Delta$p1, $\Delta$p2), which will be referred to as an SD error vector. Note that $$\Delta p1 = p1 - P1$$

$$\Delta p2 = p2 - P2$$

are both true. The SD error vector (Δp1, Δp2) represents the error (SD error) of the SD code vector (P1, P2) corresponding to the class code #c as to the tap vector (p1, p2).

On the other hand, there is a great correlation between the tap vector (p1, p2) and the true-value vector (q1, q2, q3, q4). Also, there is also a great correlation between the SD code vector (P1, P2) corresponding to the class code #c and the HD code vector (Q1, Q2, Q3, Q4), since as described later, the SD code vector (P1, P2) is the center of gravity of the student data belonging to the class of the class code #c, and the HD code vector (Q1, Q2, Q3, Q4) is the center of gravity of the tutor data corresponding to the student data belonging to the class of the class code #c.

Accordingly, there is also a great correlation between the SD error vector (Δp1, Δp2) obtained from the tap vector (p1, p2) and the SD code vector (P1, P2), and the HD error vector (Δq1, Δq2, Δq3, Δq4) obtained from the true-value vector (q1, q2, q3, q4) and the HD code vector (Q1, Q2, Q3, Q4).

From the above, the correction data corresponding to the HD error vector (Δq1, Δq2, Δq3, Δq4) can be precisely estimated based on the SD error vector (Δp1, Δp2) which has great correlation with the HD error vector (Δq1, Δq2, Δq3, Δq4) thereof.

Returning to FIG. 12, the image signal processing device 1000 has a correction data calculating unit 1040 for obtaining the correction data Δq1 through Δq4 for correcting the four pieces of pixel data q1 through q4 making up the HD signals obtained by the data generating unit 1030, based on the class tap extracted by the tap extracting unit 1010 and the class code #c obtained at the class classification unit 1020.

This correction data calculating unit 1040 obtains the SD error vector by performing subtraction between the tap vector having as the components thereof the pixel data contained in the class tap, and the SD code vector corresponding to the class code #c, and obtains the correction data Δq1 through Δq4 based on the range information of values of the components making up the SD error vector, the symbol information (m1, m2) regarding whether the values are positive or negative values, and the class code #c. The correction data calculating unit 1040 comprises a class classification codebook storage unit 1040a, a features extracting unit 1040b serving as range information obtaining means, and a correction data output unit 1040c, as shown in FIG. 16.

A predetermined class classification codebook is stored in the codebook storage unit 1040a beforehand. This class classification codebook is the same as the class classification codebook sorted in the codebook storage unit 1020a of the above-described class classification unit 1020 (see FIG. 4). That is to say, this class classification codebook is information wherein SD code vectors (P1, P2) serving as representative vectors regarding SD signals representing each class of the multiple classes have appropriated thereto class code (SD code) #c indicating the corresponding class.

The features extracting unit 1040b performs subtraction between the tap vectors (p1, p2) having as the components there of the pixel data contained in the class tap, and the SD code vector (P1, P2) read out from the storage unit 1040a corresponding to the class code #c, thereby obtaining the SD error vector (Δp1, Δp2). Note that $\Delta p1 = p1 - P1$ $\Delta p2 = p2 - P2$ are both true.

Further, the features extracting unit 1040b obtains the range information of the values of the components Δp1 and Δp2 making up the SD error vector (Δp1, Δp2). This range information is information indicating whether or not the range which the values of the components Δp1 and Δp2 can assume is included in the multiple divided ranges. With the present embodiment, the range which the components Δp1 and Δp2 can assume is divided into two ranges, positive and negative, and the features extracting unit 1040b obtains the positive/negative symbol information (m1, m2) for the values of the components Ap1 and Ap2, as this range information. For example, in the event that m1 and m2 indicate that Δp1 and Δp2 are both smaller than 0, this is 0, and in the event that m1 and m2 indicate that Δp1 and Δp2 are both 0 or greater, this is 1. In this case, there are four patterns for the symbol information (m1, m2), i.e., (1, 1), (1, 0), (0, 1), and (0, 0).

The correction data output unit 1040c outputs the correction data Δq1 through Δq4 based on the class code #c and the symbol information (m1, m2) obtained by the features extracting unit 1040b. The correction data output unit 1040c has a correction data table wherein each combination of class code #c and symbol information (m1, m2) has appropriated thereto the correction data Δq1 through Δq4 corresponding thereto as shown in FIG. 17, stored in an unshown internal storage unit. The correction data Δq1 through Δq4 corresponding to the class code #c obtained form the class classification unit 1020 and the symbol information (m1, m2) obtained with the features extracting unit 1040b is read out from this correction data table and output. How to generate this correction data table will be described later.

Also, the image signal processing device 1000 has a data correction unit 1050 for correcting the four pieces of pixel data q1 through q4 making up the HD signals generated by the data generating unit 1030, with the correction data Δq1 through Δq4 obtained by the correction data calculating unit 1040. The data correction unit 1050 comprises an adder 1050a as shown in FIG. 16. The adder 1050a adds the correction data Δq1 through Δq4 to each of the pixel data q1 through q4 respectively, and outputs corrected pixel data q1' through q4' making up the HD signals. Note that $q1' = q1 + \Delta q1$ $q2' = q2 + \Delta q2$ $q3' = q3 + \Delta q3$ $q4' = q4 + \Delta q4$ are all true.

Next, the operations of the image signals processing device 1000 shown in FIG. 12 will be described.

First, SD signals are supplied to the tap extracting unit 1010. The tap extracting unit 1010 divides the SD signals into blocks made up of the two pixels of pixel data adjacent in the horizontal direction, and extracts the pixel data p1 and p2 contained in each block (see FIG. 2) as a class tap, for each of the blocks.

The class tap extracted at the class tap extracting unit 1010 is supplied to the class classification unit 1020. At the class classification unit 1020, the class tap is classified into one of multiple classes based on the class tap, and a class code #c corresponding to the class tap is obtained. In this case, a tap vector (p1, p2) having as the components thereof the pixel data p1 and p2 contained in the class tap is subjected to vector quantization using the class classification codebook (see FIG. 4), thereby yielding a class code #c corresponding to the class tap.

The class code #c obtained at the class classification unit 1020 is then supplied to the data generating unit 1030.

The data generating unit 1030 generates the four pieces of pixel data q1 through q4 (see FIG. 2) making up the HD signal corresponding to the class tap extracted by the tap extracting unit 1010, based on the class code #c. In this case, the data generating unit 1030 performs inverse vector quantization of the class code #c using the data generating codebook (see FIG. 14), so as to obtain an HD code vector (q1, q2, q3, q4) having as components thereof the four pieces of pixel data q1 through q1 which make up the HD signal.

Also, the class tap extracted with the tap extracting unit 101 and the class code #c extracted with the class classification unit 1020 are each supplied to the correction data calculating unit 1040. At the correction data calculating unit 1040, the correction data $\Delta q1$ through $\Delta q4$ for correcting the four pieces of pixel data q1 through q4 making up the HD signals obtained by the data generating unit 1030 is obtained, based on the class tap and the class code #c.

In this case, subtraction is performed between tap vector having as the components thereof the pixel data contained in the class tap, and the SD code vector corresponding to the class code #c, thereby obtaining the SD error vector, and corresponding correction data $\Delta q1$ through $\Delta q4$ is read out from the correction data table (see FIG. 17) based on the positive/negative symbol information (m1, m2) of each of the components making up the SD error vector and the class code #C, and output.

The HD code vector corresponding to the class tap that has been generated at the data generating unit 1030, i.e., the four pieces of pixel data q1 through q4 making up the HD signals, is supplied to the data correction unit 1050. Also supplied to the data correction unit 1050 is the four pieces of pixel data q1 through q4 output from the correction data calculating unit 1040. At the data correction unit 1050, the data $\Delta q1$ through $\Delta q4$ is added to the corresponding pixel data correction q1 through q4, thereby obtaining the four pieces of corrected pixel data q1' through q4' making up the HD signals. That is to say, the HD signals to be output are made up of the four pieces of corrected pixel data q1' through q4' corresponding to each class tap.

In this way, with the image signal processing device 1000 shown in FIG. 12, at the time of converting SD signals into HD signals, four pieces of pixel data q1 through q4 making up the HD signals are generated for each block comprising two pieces of pixel data p1 and p2 obtained by dividing the SD signals, based on the class code #c of the class tap made up of the pixel data contained in this block, and further correcting this generated pixel data q1 through q4 using correction data $\Delta q1$ through $\Delta q4$, whereby SD signals can be suitably converted into HD signals. The image signal processing device 1000 can be applied to devices for outputting image signals, such as television receivers, image signal reproducing devices, and so forth.

Also, in this case, the correction data $\Delta q1$ through $\Delta q4$ is obtained based on the SD error vector ($\Delta p1$, $\Delta p2$) obtained by performing subtraction between the tap vector (p1, p2) having as the components thereof the pixel data contained in the class tap, and the SD code vector (P1, P2) corresponding to the class code #c, so the correction data $\Delta q1$ through $\Delta q4$ can be obtained in a precise manner.

Also, in this case, the correction data $\Delta q1$ through $\Delta q4$ is obtained based on the positive/negative symbol information (m1, m2) serving as range information of the components making up the SD error vector ($\Delta p1$, $\Delta p2$) obtained by performing subtraction between the tap vector (p1, p2) having as the components thereof the pixel data contained in the class tap, and the SD code vector (P1, P2), so the scale of the correction data table can be reduced for example, in comparison with cases of using the components making up the SD error vector ($\Delta p1$, $\Delta p2$) without change, and further, processing for obtaining the correction data $\Delta q1$ through $\Delta q4$ is facilitated.

That is to say, in the event of using the components making up the SD error vector ($\Delta p1$, $\Delta p2$) without change, using a correction data table wherein correction data $\Delta q1$ through $\Delta q4$ is correlated to all combinations of the component values would make the processing for obtaining the correction data $\Delta q1$ through $\Delta q4$ easy, but the correction data table would become extremely great in size.

On the other hand, using the correction data table wherein the correction data $\Delta q1$ through $\Delta q4$ is correlated with combinations of representative values of the components making up the SD error vector ($\Delta p1$, $\Delta p2$) enables the size of the correction data table to be reduced, but this requires determination processing for determining which representative combination the combination of values of the components making up the SD error vector ($\Delta p1$, $\Delta p2$) matches, and accordingly the processing for obtaining the correction data $\Delta q1$ through $\Delta q4$ becomes difficult.

Figure 26:
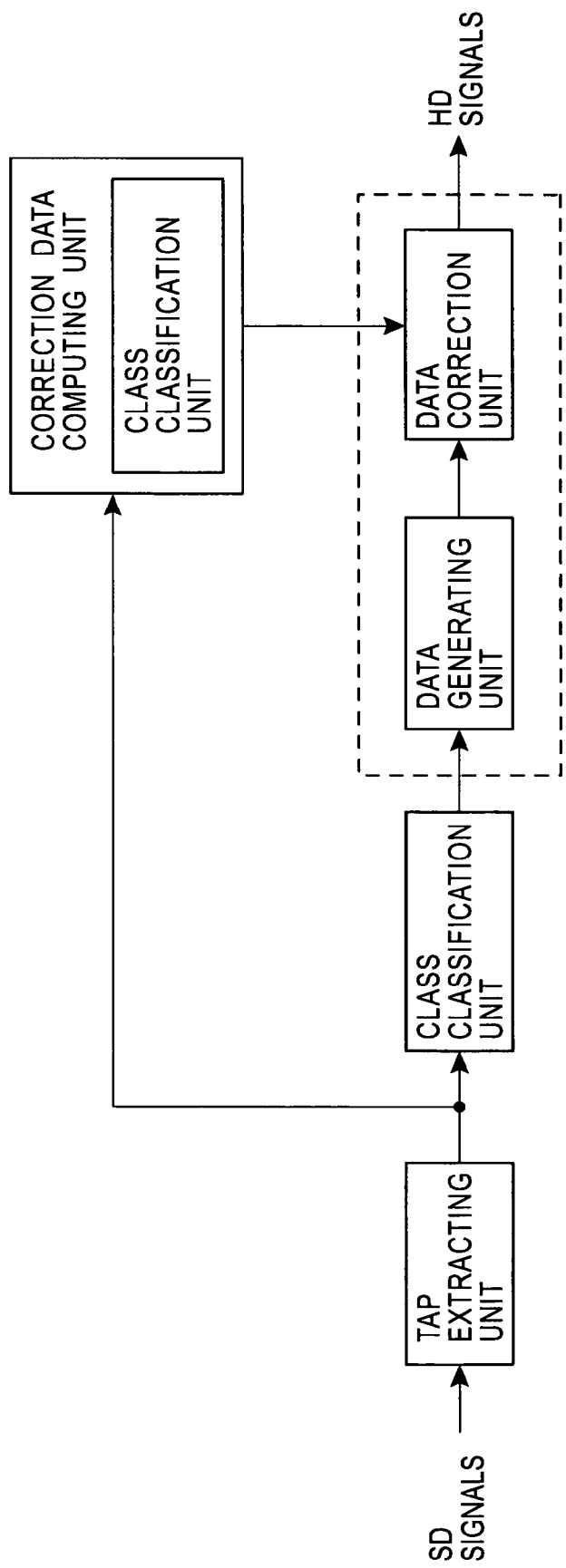
FIG. 26 is a block diagram illustrating another example of the image processing device.
Figure 27:
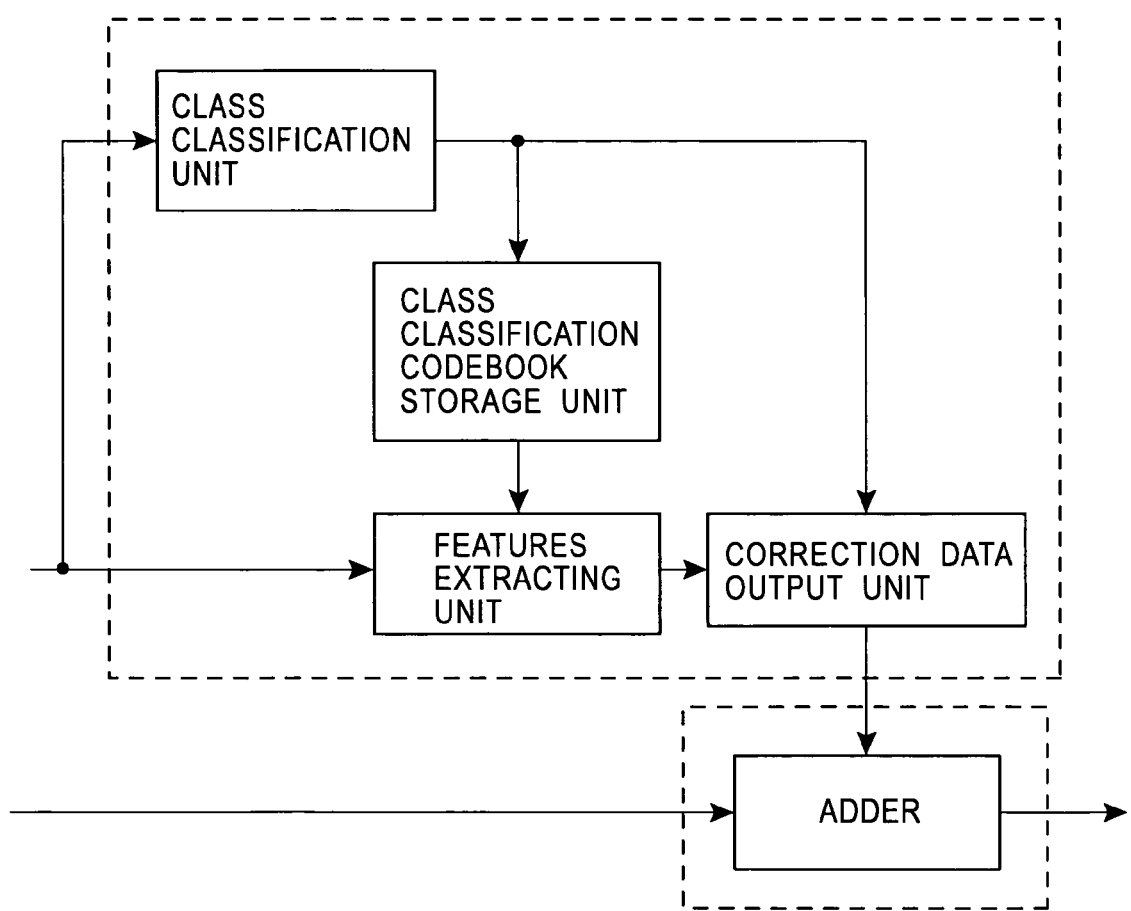
FIG. 27 is a block diagram illustrating a detail example of an auxiliary data generating unit in another example of the image processing device.

Note that while a description has been made regarding a configuration wherein a class tap and class code are input to the correction data generating unit as shown in FIG. 12, this may be realized by a configuration such as shown in FIGS. 26 and 27. FIG. 26 is a modification wherein the class classification unit shown in FIG. 12 is also provided within the correction data generating unit. Also, FIG. 27 is a detailed diagram of the correction data calculation unit and data correction unit, and illustrates a configuration for obtaining class code based on the supplied class tap, thereby exhibiting the same advantages as with the configuration shown in FIG. 12 to which class code is supplied. These arrangements are the same as the configuration shown in FIG. 12 except for the points mentioned here, so further description will be omitted.

Next, a device generating the class classification codebook stored in the codebook storage unit 1020a of the class classification unit 1020, and the data generating codebook stored in the codebook storage unit 1030a of the data generating unit 1030 will be described.

Figure 18:
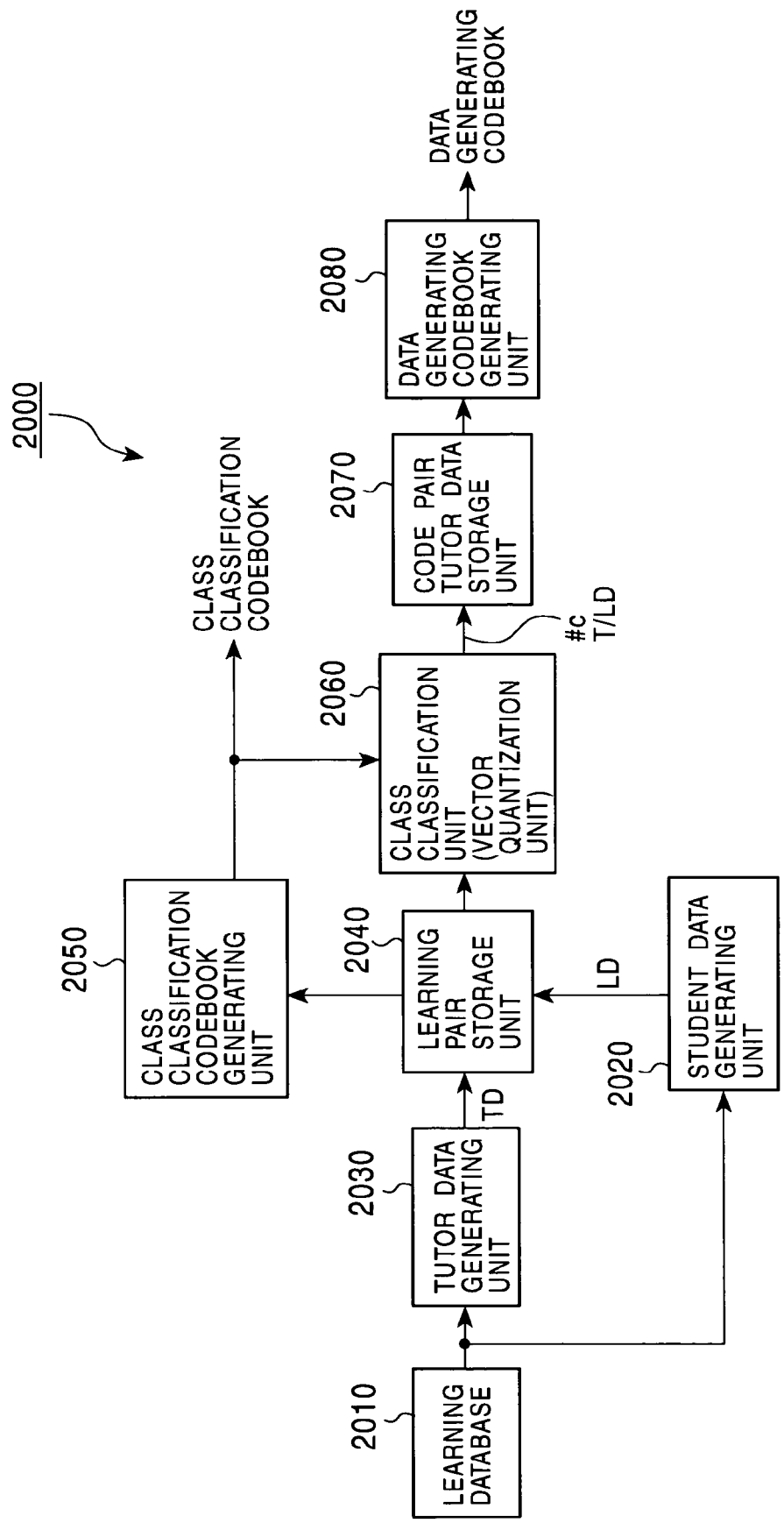
FIG. 18 is a block diagram illustrating the configuration of a codebook generating device.

FIG. 18 illustrates an example of the configuration of a codebook generating device 2000 for generating the class classification codebook and data generating codebook. The codebook generating device 2000 has a learning database 2010 which stores learning image signals serving as tutor signals corresponding to the HD signals.

Also, the codebook generating device 2000 comprises a student data generating unit 2020 serving as first tap extracting means. The student data generating unit 2020 thins out the pixel data number of the learning image signals (tutor signals) so as to be ½ in the horizontal direction using a thinning-out filter (low-pass filter) so as to obtain student signals corresponding to SD signals, divides the student signals into first blocks made up of two horizontally-adjacent pieces of pixel data p1 and p2 see FIG. 2), and extracts the pixel data contained in this first block as a first tap (student data), for each block.

Also, the codebook generating device 2000 comprises a tutor data generating unit 2030 serving as second tap extracting means. The tutor data generating unit 2030 divides the learning image signals (tutor signals) into second blocks made up of horizontally-adjacent four pixels of pixel data q1 through q4 (see FIG. 2) corresponding to the first block obtained by dividing with the aforementioned student data generating unit 2020, and extracts the pixel data contained in the second block as a second tap (tutor data), for each block.

Now, one first tap (student data) extracted with the student data generating unit 2020, and a corresponding one second tap (tutor data) extracted with the tutor data generating unit 2030, make up one learning pair. With the codebook generating device 2000, a class classification codebook and a data generating codebook are generated using multiple learning pairs.

Note that while the student data generating unit obtains and uses student signals corresponding to SD signals by thinning out the pixel data number of learning image signals (tutor data) so as to be ½ in the horizontal direction, an arrangement may be made wherein learning image signals are also stored in the learning database 2010 as student signals corresponding to the SD signals, so as to use the learning image signals (student signals).

Also, the codebook generating device 2000 comprises a learning pair storage unit 2040 for storing multiple learning pairs made up from the first tap (student data) extracted by the student data generating unit 2020 and second tap (tutor data) extracted by the tutor data generating unit 2030.

FIG. 19 illiterates learning pair data stored in the learning pair storage unit 2040. The learning pair storage unit 2040 stores learning pair data which is combinations of 4-pixel tutor data q1 through q4 and 2-pixel student data p1 and p2 corresponding to the tutor data q1 through q4. FIG. 19 shows N sets of learning pair data having been stored. The variable "i" in the tutor data q$1(i)$ through q$4(i)$ and student data p$1(i)$ and p$2(i)$ here indicate that the data is the i'th learning pair data, as can be seen from the numbers in parentheses in FIG. 19.

Also, the codebook generating device 2000 comprises a class classification codebook generating unit 2050. The codebook generating unit 2050 sequentially reads learning pair data out from the learning pair storage unit 2040, and generates a class classification codebook using the student data of the learning pair data.

In this case, the codebook generating unit 2050 generates the class classification codebook using the tap vector (p1, p2) having as the components thereof the two pieces of pixel data p1 and p2 contained in the student data, with the LBG (Linde Buzo Gray) algorithm, for example. The class classification codebook is stored in an unshown storage unit built into the codebook generating unit 2050, and is read out from this storage unit as necessary and used. The class classification codebook is stored in the codebook storage unit 1020a shown in FIG. 13 described above and used, and as shown in FIG. 4, is appropriation information wherein SD code vectors (P1, P2) serving as representative vectors for the SD signals representing each class have appropriated thereto class code (SD code) #c indicating the corresponding class, for each of the multiple classes.

Also, the codebook generating device 2000 comprises a class classification unit 2060. The class classification unit 2060 has the same configuration as the above-described vector quantization unit 1020b shown in FIG. 13, and sequentially reads out learning pairs from the learning pair storage unit 2040, and performs class classification of the learning data using the student data of the learning pair data.

The class classification unit 2060 obtains the distance between the tap vector (p1, p2) having as the components thereof the two pieces of pixel data contained in the student data and the SD code vectors of multiple classes (P1, P2), based on the class classification codebook stored in the storage unit of the codebook generating unit 2050, and outputs the class code #c appropriated to the SD code vector (P1, P2) which minimizes this distance. Note that the class classification unit 2060 outputs the class code #c obtained by classifying the student data along with the corresponding learning pair data.

Also, the codebook generating device 2000 comprises a code pair tutor data storage unit 2070. The storage unit 2070 extracts the tutor data from the learning pair data output from the class classification unit 2060, and generates code pair tutor data wherein the tutor data has been correlated with class code #c output from the class classification unit 2060 along with the learning pair data, which is stored.

FIG. 20 illustrates code pair tutor data stored in the storage unit 2070. With the code pair tutor data, the class code #c indicating the class of the student data and the 4-pixel tutor data q1 through q4 corresponding to the tutor data are correlated. The code pair tutor data shown in FIG. 20 corresponds to the learning data shown in FIG. 19. That is to say, in FIG. 20, the tutor data q$1(i)$ through q$4(i)$ is the same as that shown in FIG. 19, and the class code #ci correlated to the i'th tutor data q$1(i)$ through q$4(i)$ is class code of the i'th student data p$1(i)$ and p$2(i)$.

Further, the codebook generating device 2000 comprises a data generating codebook generating unit 2080. The data generating codebook generating unit 2080 sequentially reads out code pair tutor data from the code pair tutor data storage unit 2070, and generates the data generating codebook using the code pair tutor data.

In this case, the data generating codebook generating unit 2080 obtains, for example, tutor data of the same class code #c from the code pair tutor data, and further obtains the center of gravity of each vector having as the components thereof the pixel data contained in each tutor data. Specifically, saying that M pieces of tutor data with the same class code #c exist for example, and expressing the vector relating to the m'th tutor data thereof as $(q1(m), q2(m), q3(m), q4(m))$, the codebook generating unit 2080 obtains a center-of-gravity vector relating to the tutor data with the class code #c, expressed by $(\Sigma q1(m)/M, \Sigma q2(m)/M, \Sigma q3(m)/M, \Sigma q4(m)/M)$. Here, $\Sigma$ represents the summation of m from 1 to M.

The codebook generating unit 2080 then correlates the center-of-gravity vector relating to the tutor data of class code #c with the class code #c, as a code vector (HD vector) (Q1, Q2, Q3, Q4) for the HD signals which represents the class indicated by the class code #c, and thus generates the data generating codebook.

The data generating codebook is stored in an unshown storage unit built into the codebook generating unit 2080, and is read out from this storage unit as necessary and used. The data generating codebook is stored in the codebook storage unit 1030a shown in FIG. 13 described above and used, and as shown in FIG. 14, is appropriation information wherein HD code vectors (Q1, Q2, Q3, Q4) serving as representative vectors for the HD signals representing each class have appropriated thereto class code #c.

Next, the operations of the codebook generating device 2000 shown in FIG. 18 will be described. Learning image signals serving as tutor signals corresponding to the HD signals stored in the learning database 2010 are supplied to the student data generating unit 2020. At the student data generating unit 2020, the first tap (student data) is extracted based on the learning image signals (tutor signals).

That is to say, the pixel data number of learning image signals is thinned out using a thinning-out filter so as to be ½ in the horizontal direction, so as to obtain student signals corresponding to the SD signals, and further, the student signals are divided into first blocks made up of two horizontally-adjacent pieces of pixel data p1 and p2 (see FIG. 2), and the pixel data contained in this first block is extracted as the first tap (student data), for each block.

Also, learning image signals serving as tutor signals corresponding to the HD signals stored in the learning database 2010 are supplied to the tutor data generating unit 2030. At the tutor data generating unit 2030, the second tap (tutor data) is extracted based on the learning image signals (tutor signals). That is to say, the learning image signals (tutor signals) are divided into second blocks made up of four pieces of horizontally-adjacent pixel data q1 through q4 (see FIG. 2) corresponding to the first blocks obtained by dividing with the student data generating unit 2020, and the pixel data contained in the second block is extracted as the second tap (tutor data), for each block.

Each first tap (student data) extracted at the student data generating unit 2020 and each second tap (tutor data) extracted at the tutor data generating unit 2030 is supplied to the learning pair storage unit 2040. The learning pair storage unit 2040 stores multiple pieces of learning pair data (see FIG. 10) each made up of a first tap (student data) and second tap (tutor data).

Then, at the class classification codebook generating unit 2050, learning pair data is sequentially read out from the learning pair storage unit 2040, the student data of the learning pair data is used, and the class classification codebook (see FIG. 4) is generated with the LBG algorithm for example, using the tap vector (p1, p2) having as the components thereof the two pieces of pixel data p1 and p2 contained in the student data (first tap).

The class classification codebook is stored in the codebook storage unit 1020a shown in FIG. 13 and used. The class classification codebook is stored in a storage unit built into the codebook generating unit 2050, and read out from this storage unit as necessary and used.

Also, at the class classification unit 2060, learning pair data is sequentially read out from the learning pair storage unit 2040, and the student data of the learning pair data is classified into one of multiple classes, thereby obtaining the class code #c. In this case, the tap vector (p1, p2) having as the components thereof the pixel data p1 and p2 contained in the student data (first tap) is subjected to vector quantization using the class classification codebook stored in the storage unit of the codebook generating unit 2050, thereby yielding the class code #c corresponding to the student data.

The class code #c obtained by classifying the student data is output from the class classification unit 2060 along with the corresponding learning pair data, and these are supplied to the code pair tutor data storage unit 2070. At the storage unit 2070, the tutor data is extracted from the learning pair data output from, the class classification unit 2060, and code pair tutor data (see FIG. 20) wherein the learning pair data and the class code #c output from the class classification unit 2060 are correlated with the tutor data, is generated and stored.

At the data generating codebook generating unit 2080, the code pair tutor data is sequentially read out from the code pair tutor data storage unit 2070, and the data generating codebook (see FIG. 14) is generated using the code pair tutor data.

In this case, at the codebook generating unit 2080, tutor data with the same class code #c is obtained form the code pair tutor data for example, and further, the center of gravity of each vector having as the components thereof the pixel data contained in each of the obtained tutor data, is obtained. At the codebook generating unit 2080, the center-of-gravity vector relating to the tutor data of the class code #c is correlated with the class code #c as a code vector (HD code vector) (Q1, Q2, Q3, Q4) regarding the HD signals, representing the class indicated by the class code #c, thereby generating a data generating codebook.

This data generating codebook is stored in the codebook storage unit 1030a shown in FIG. 13 and used. The data generating codebook is stored in a storage unit built into the codebook generating unit 2080, and read out from this storage unit as necessary and used.

Thus, according to the codebook generating device 2000 shown in FIG. 18, the class classification codebook and data generating codebook used with the image signal generating device 1000 shown in FIG. 12 can be suitably generated.

Note that while an arrangement has been shown for the codebook generating device 2000 shown in FIG. 18 wherein the class classification codebook generating unit 2050 generates the codebook according to the LBG algorithm for example, but this codebook may be generated with procedures other than procedures used for generating codebooks used for vector quantization.

That is to say, the class classification codebook may be generated as shown in FIG. 8, for example. Here, in FIG. 8, two-dimensional space (SD image space) representing the two pieces of pixel data p1 and p2 contained in the student data (the first tap) is sectioned as a grid, thereby forming rectangular regions r(i, j). Note that in FIG. 8, the pixel values of the pixel data p1 and p2 are represented by the horizontal and vertical axes, respectively.

The pixel data p1 and p2 is 8-bit data with the present embodiment, so the values which can be assumed on the horizontal and vertical axes of the SD image space are 0 through 255 (i.e., $2^8-1$). Also, in FIG. 8, r(i, j) represents a region the i'th from the left and the j'th from the bottom in the SD image space, and a unique class code #c representing the class is appropriated to each region r(i, j).

The class classification codebook generating unit 2050 obtains the student data contained in the region r(i, j) for each region r(i, j), and further obtains the center of gravity of each vector having as the components thereof the pixel data contained in each student data, for example. That is to say, in a case wherein there are K student data contained in a region r(i, j), and the k'th student data is represented as $(P_{1,r(i,j)}(k), p_{2,r(i,j)}(k))$, the class classification codebook generating unit 2050 obtains the center of gravity of the student data of the class code #c which has been appropriated to the region r(i, j), represented by $(\Sigma p_{1,r(i,j)}(k)/K, \Sigma p_{2,r(i,j)}(k)/K)$. Here, $\Sigma$ represents the summation of k from 1 to K.

The class classification codebook generating unit 2050 then correlates the center of gravity of the student data with the class code #c with the class code #c, as a SD code vector (P1, P2) regarding SD signals, representing the class known by the class code #c. This generates the class classification codebook such as shown in FIG. 4.

Next, a device for generating correction data tables, provided to the correction data output unit 1040c of the above-described correction data calculating unit 1040 will be described.

Figure 21:
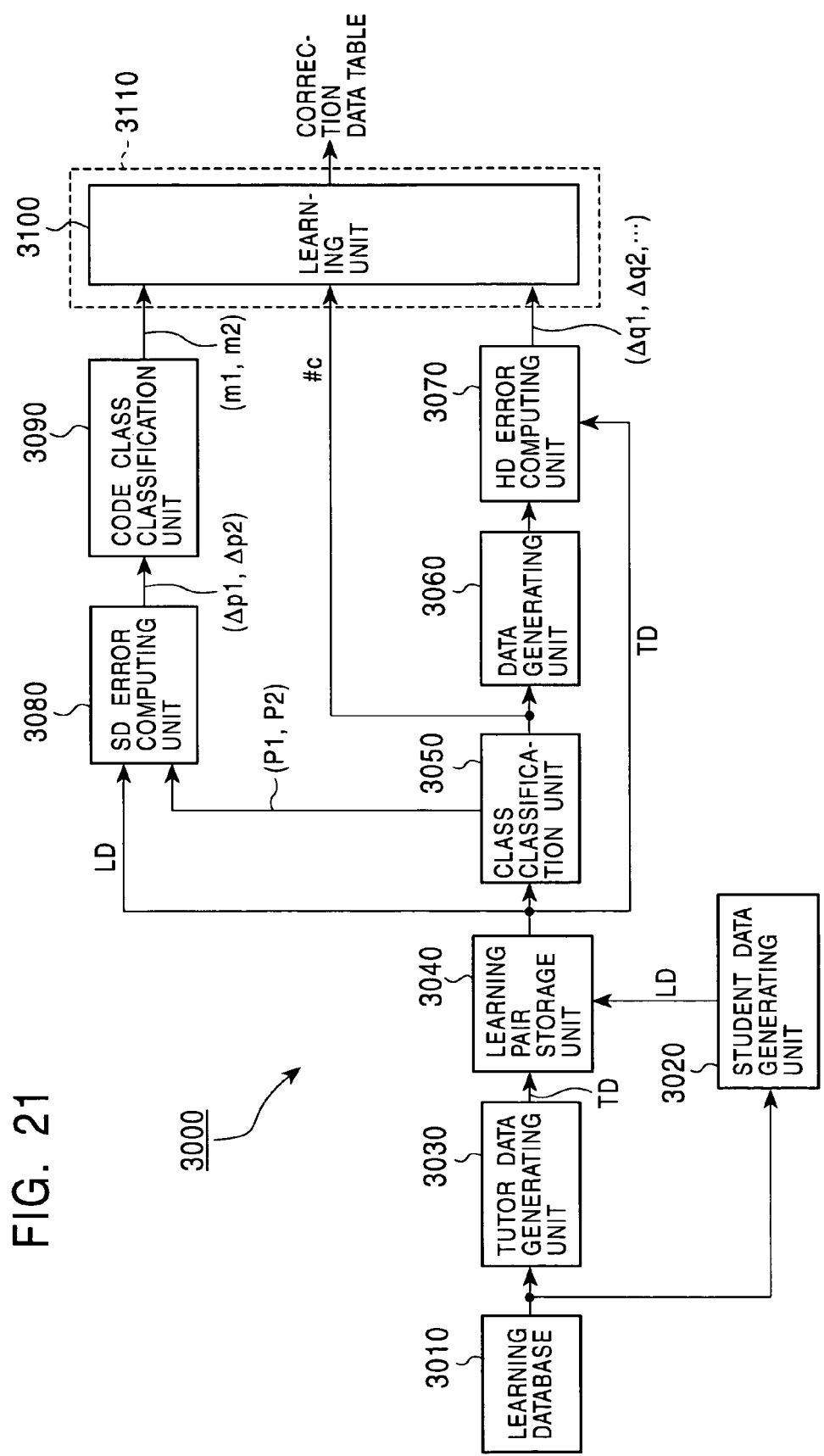
FIG. 21 is a block diagram illustrating the configuration of a correction data table generating device.

FIG. 21 illustrates the configuration of a correction data table generating device 3000 for generating a correction data table. The table generating device 3000 comprises a learning database 3010, which stores learning image signals serving as tutor signals corresponding to HD signals. The learning image signals stored in the learning database 3010 do not necessarily need to be the same image signals as the learning image signals stored in the learning database 2010 shown in FIG. 18.

Also, the table generating device 3000 has a student data generating unit 3020 serving as first tap extracting means, a tutor data generating unit 3030 serving as second tap extracting means, and a learning pair storage unit 3040 for storing learning pair data. Though detailed description will be omitted, these are configured in the same way as the student data generating unit 2020, tutor data generating unit 2030, and learning pair storage unit 2040, of the codebook generating device 2000 in FIG. 18 which perform the same processing.

Also, the table generating device 3000 comprises a class classification unit 3050. The class classification unit 3050 sequentially reads out learning pair data from the learning pair unit 3040, and performs class classification of the student data LD of the learning pair data. The class classification unit 3050 stores a class classification codebook generated beforehand using the codebook generating device 2000 in FIG. 18.

The class classification unit 3050 obtains the distance between the tap vector (p1, p2) having as the components thereof the two pieces of pixel data p1 and p2 contained in the student data, and the SD code vectors (P1, P2) of multiple classes, based on the class classification codebook, and outputs class code #c appropriated to the SD code vector (P1, P2) wherein this distance is minimized.

The class classification unit 3050 not only outputs the class code #c obtained by performing class classification of the student data in the learning pair data, but also outputs the SD code vector (P1, P2) corresponding to the class code #c.

Also, the table generating device 3000 comprises a data generating unit 3060. The data generating unit 3060 is configured in the same way as the data generating unit 1030 shown in FIG. 13. The data generating unit 3060 generates HD code vector (Q1, Q2, Q3, Q4) corresponding to the student data, based on the class code #c obtained by the class classification unit 3050. In this case, the data generating unit 3060 stores a data generating codebook generated beforehand using the codebook generating unit 2000 in FIG. 18 for example, subjects the class code #c to inverse vector quantization using the data generating codebook, and obtains the HD code vector (Q1, Q2, Q3, Q4).

Also, the table generating device 3000 comprises an HD error computing unit 3070 as second error computing means. The HD error computing unit 3070 reads the tutor data TD in the learning pair data used for generating the HD code vector (Q1, Q2, Q3, Q4) supplied from the data generating unit 3060 out from the learning pair storage unit 3040, and obtains an HD error vector ($\Delta$q1, $\Delta$q2, $\Delta$q3, $\Delta$q4) wherein the HD code vector (Q1, Q2, Q3, Q4) is subtracted from the tap vector (q1, q2, q3, q4) having as the components thereof the pixel data q1 through q4 contained in the tutor data. Note that $$\Delta q1 = q1 - Q1$$

$$\Delta q2 = q2 - Q2$$

$$\Delta q3 = q3 - Q3$$

$$\Delta q4 = q4 - Q4$$

are all true.

Also, the table generating device 3000 comprises an SD error computing unit 3080 as first error computing means. The SD error computing unit 3080 reads the student data used for obtaining the class code #c output from the class classification unit 3050 from the learning pair storage unit 3040, and obtains the SD error vector ($\Delta$p1, $\Delta$p2) by subtracting from the tap vector (p1, p2) having as the components thereof the pixel data p1 and p2 contained in the student data, the SD code vector (P1, P2) of the class which the class code #c thereof represents. Note that $$\Delta p1 = p1 - P1$$

$$\Delta p2 = p2 - P2$$

are both true.

Also, the table generating device 3000 comprises a code class classification unit 3090 as range information obtaining means. The code class classification unit 3090 obtains range information of the values of the components making up the SD error vector ($\Delta$p1, $\Delta$p2) obtained with the SD error computing unit 3080. Here, as with the processing of the features extracting unit 1040b of the correction data calculating unit 1040 of the image signal processing device 1000, the range which the components $\Delta$p1 and $\Delta$p2 can assume is divided into two ranges, positive and negative, and the code class classification unit 3090 obtains the positive/negative symbol information (m1, m2) for the components $\Delta$p1 and $\Delta$p2, as this range information. For example, in the event that m1 and m2 indicate that $\Delta$p1 and $\Delta$p2 are both smaller than 0, this is 0, and in the event that m1 and m2 indicate that $\Delta$p1 and $\Delta$p2 are both 0 or greater, this is 1.

Also, the table generating device 3000 comprises a learning unit 3100. This learning unit 3100 generates a correction data table (see FIG. 17) with correction data $\Delta$q1 through $\Delta$q4 corresponding to each combination of class code #c and symbol information (m1, m2) is appropriated to correction data $\Delta$q1 through $\Delta$q4 corresponding to each combination of class code #c and symbol information (m1, m2), according to learning using: symbol information (m1, m2) regarding all learning data obtained by the code class classification unit 3090; HD error vectors ($\Delta$q1, $\Delta$q2, $\Delta$q3, $\Delta$q4) for all learning pairs obtained by the HD error computing unit 3070; and class code #c for all learning pairs obtained by the class classification unit 3050.

In this case, the learning unit 3100 obtains an HD error vector ($\Delta$q1, $\Delta$q2, $\Delta$q3, $\Delta$q4) matching a combination with the same class code #c and symbol information (m1, m2) for example, and further obtains the center of gravity of the HD error vector. Specifically, saying that N HD error vectors ($\Delta$q1, $\Delta$q2, $\Delta$q3, $\Delta$q4) matching a combination with the same class code #c and symbol information (m1, m2) exist for example, and expressing the n'th HD error vector as (q1($n$), q2($n$), q3($n$), q4($n$)), the learning unit 3100 obtains the center of gravity of the HD error vector matching the combination, expressed by ($\Sigma\Delta$q1($n$)/N, $\Sigma\Delta$q2($n$)/N, $\Sigma\Delta$q3($n$)/N, $\Sigma\Delta$q4($n$)/N). The learning unit 3100 then takes each of the components $\Sigma\Delta$q1($n$)/N through $\Sigma\Delta$q4($n$)/N making up the center-of-gravity vector as the correction data $\Delta$q1 through $\Delta$q4 of the combination.

Next, the operations of the codebook generating device 3000 shown in FIG. 21 will be described. Learning image signals serving as tutor signals corresponding to the HD signals stored in the learning database 3010 are supplied to the student data generating unit 3020. At the student data generating unit 3020, the first tap (student data) is extracted based on the learning image signals (tutor signals).

That is to say, the pixel data number of learning image signals is thinned out using a thinning-out filter so as to be ½ in the horizontal direction, so as to obtain student signals corresponding to the SD signals, and further, the student signals are divided into first blocks made up of two horizontally-adjacent pieces of pixel data p1 and p2 (see FIG. 2), and the pixel data contained in this first block is extracted as the first tap (student data), for each block.

Also, learning image signals serving as tutor signals corresponding to the HD signals stored in the learning database 3010 are supplied to the tutor data generating unit 3030. At the tutor data generating unit 3030, the second tap (tutor data) is extracted based on the learning image signals (tutor signals). That is to say, the learning image signals (tutor signals) are divided into second blocks made up of four pieces of horizontally-adjacent pixel data q1 through q4 (see FIG. 2) corresponding to the first blocks obtained by dividing with the student data generating unit 3020, and the pixel data contained in the second block is extracted as the second tap (tutor data), for each block.

Each first tap (student data) extracted at the student data generating unit 3020 and each second tap (tutor data) extracted at the tutor data generating unit 3030 is supplied to the learning pair storage unit 3040. The learning pair storage unit 3040 stores multiple pieces of learning pair data (see FIG. 10) each made up of a first tap (student data) and second tap (tutor data).

Then, at the class classification unit 3050, learning pair data is sequentially read out from the learning pair storage unit 3040, and the student data of the learning pair data is classified into one of multiple classes, yielding the class code #c. In this case, the tap vector (p1, p2) having as the components thereof the two pieces of pixel data p1 and p2 contained in the student data (first tap) is subjected to vector quantization using the class classification codebook (see FIG. 4), whereby the class code #c corresponding to the student data is obtained.

The class classification unit 3050 outputs the class code #c obtained by performing class classification of the student data in the learning pair data, and also outputs the SD code vector (P1, P2) corresponding to the class code #c. The class code #c obtained by the class classification unit 3050 is supplied to the data generating unit 3060.

The data generating unit 3060 generates HD code vector (Q1, Q2, Q3, Q4) corresponding to the student data, based on the class code #c. In this case, the data generating unit 3060 subjects the class code #c to inverse vector quantization using the data generating codebook (see FIG. 14), and obtains the HD code vector (Q1, Q2, Q3, Q4).

The HD code vector (Q1, Q2, Q3, Q4) obtained by the data generating unit 3060 is supplied to the HD error computing unit 3070. The HD error computing unit 3070 further reads the tutor data in the learning pair data used for generating the HD code vector (Q1, Q2, Q3, Q4) supplied from the data generating unit 3060 out from the learning pair storage unit 3040. The HD error computing unit 3070 obtains an HD error vector (Δq1, Δq2, Δq3, Δq4) wherein the HD code vector (Q1, Q2, Q3, Q4) is subtracted from the tap vector (q1, q2, q3, q4) having as the components thereof the pixel data q1 through q4 contained in the tutor data.

The SD code vector (P1, P2) corresponding to the class code #c obtained with the class classification unit 3050 and output from the class classification unit 3050 is supplied to the SD error computing unit 3080. The SD error computing unit 3080 further reads the student data used for obtaining the class code #c output from the class classification unit 3050 from the learning pair storage unit 3040. The SD error computing unit 3080 obtains the SD error vector (Δp1, Δp2) by subtracting from the tap vector (p1, p2) having as the components thereof the pixel data p1 and p2 contained in the student data, the SD code vector (P1, P2).

The SD error vector (Δp1, Δp2) obtained with the SD error computing unit 3080 is supplied to the code class classification unit 3090. The code class classification unit 3090 obtains positive/negative symbol information (m1, m2) of the values of the components Δp1 and Δp2 making up the SD error vector (Δp1, Δp2). Here, in the event that m1 and m2 indicate that Δp1 and Δp2 are both smaller than 0, this is 0, and in the event that m1 and m2 indicate that Δp1 and Δp2 are both 0 or greater, this is 1.

The symbol information (m1, m2) obtained by the code class classification unit 3090 is supplied to the learning unit 3100 of the correction data table generating unit 3110. Also supplied to the learning unit 3100 are the class code #c obtained by the class classification unit 3050 and the HD error vector (Δq1, Δq2, Δq3, Δq4) obtained by the HD error computation unit 3070. The learning unit 3100 generates a correction data table (see FIG. 17) with correction data Δq1 through Δq4 corresponding to each combination of class code #c and symbol information (m1, m2), according to learning using symbol information (m1, m2), HD error vectors (Δq1, Δq2, Δq3, Δq4), and class code #c, for all learning pairs.

Now a combination of the symbol information (m1, m2) can also be expressed as a features class code. That is to say, a features class code is a pattern determined based on range information of the values of the components making up an error vector obtained by performing subtraction between the tap vector having as the components thereof the information contained in the class tap, and the representative vector corresponding to the class code.

In this case, the learning unit 3100 obtains the center of gravity of the HD error vector (Δq1, Δq2, Δq3, Δq4) for each combination of class code #c and symbol information (m1, m2) for example, and the components making up the obtained center-of-gravity vector are used as the correction data Δq1 through Δq4 of the combination.

With the present embodiment, class classification is performed based on SD signals, and further, classification is performed for each class based on the positive/negative symbol information of error (Δp1, Δp2) of luminance signals in the level direction between tap vector (p1, p2) and code vector (P1, P2) for example. Such a configuration allows a much smaller correction table to be generated which has the same advantages as an error correction data table wherein correlating objects such as SD error signals (Δp1, Δp2) and HD error signals (Δq1, Δq2, Δq3, Δq4) for example, are correlated on a one-to-one basis. Also, the number of calculations for generating the table is far smaller.

The reason is that, with luminance signals for example, with an error correction table wherein the SD error signals and HD error signals are correlated on a one-to-one basis, considering each SD tap vector to be one class in this case taking into consideration positive and negative error signals, there will be 511×511 classes. Conversely, with the present invention, class classification is performed based on tap vectors (p1, p2) extracted from SD signals, and learning is carried out statistically, so an optional number of classes can be set. This is advantageous in that the total number of classes can be reduced. In the case of the present embodiment, the total number of classes is the number of class codes×4, which is a significantly smaller number of classes, and accordingly, the number of calculations, and also the size of the table, can be markedly reduced.

Also, employing a configuration for statistical learning is advantageous in that the robustness with regard to error correction can be improved over the above-described one-to-one correlation error correction tables.

Also, the processing of the image signal processing device 1000 shown in FIG. 12 described above can be performed by software on an image signal processing device (computer) 500 such as shown in FIG. 9, for example.

First, the image signal processing device 500 shown in FIG. 9 will be described. The image signal processing device 500 comprises a CPU 501 for controlling the operation of the entire device, ROM (Read-Only Memory) 502 storing the control programs for the CPU 501, codebooks, correction data tables, etc., and RAM (Random Access Memory) 503 making up a work region for the CPU 501 the CPU 501, ROM 502, and RAM 503 are each connected to a bus 504.

Also, the image signal processing device 500 has a hard disk drive (HDD) 505 serving as an external storage device, and a drive 506 for handling removable recording media such as diskettes, CD-ROM (Compact Disc Read-Only Memory), MO (Magneto-optical) disks, DVDs (Digital Versatile Disks), magnetic disks, semiconductor memory, or the like. The drives 505 and 506 are each connected to the bus 504.

Also, the image signal processing device 500 has a communication unit 508 for cable or wireless connection to a communication network 507 such as the Internet. The communication unit 508 is connected to the bus 504 via an interface 509.

Also, the image signal processing device 500 has a user interface unit. The user interface unit comprises a remote control signal reception circuit 511 for receiving remote control signals RM from a remote control transmitter 510, and a display 513 which is a CRT (Cathode Ray Tube), LCD (Liquid Crystal Display), or the like. The reception circuit 511 is connected to the bus 504 through an interface 512, and the display 513 is similarly connected to the bus 504 through an interface 514.

Further, the image signal processing device 500 comprises an input terminal 515 for inputting SD signals, and an output terminal 517 for outputting HD signals. The input terminal 515 is connected to a bus 514 via an interface 516, and in the same way, the output terminal 517 is connected to the bus 504 via an interface 518.

Now, an arrangement may be made wherein, instead of storing the control programs and codebooks and correction data tables and the like in the ROM 502 beforehand, these are downloaded from a communication network 507 such as the Internet for example via the communication unit 508, and stored in the hard disk device 505 or RAM 503 for use, for example. Also, the programs and codebooks and the like may be provided as removable recording media. Also, instead of inputting the SD signals to be processed via the input terminal 515, the SD signals may be supplied by a removable recording media, or downloaded via the communication unit from the communication network 507 such as the Internet. Also, arrangements may be used wherein instead of or in conjunction with outputting the post-processing HD signals to the output terminal 517, the HD signals are supplied to the display 513 for display, stored in the hard disk drive 505, and/or send to the communication network 507 such as the Internet via the communication unit 508, and so forth.

The processing procedures for obtaining HD signals from SD signal with the image signal processing device 500 shown in FIG. 9 will be described with reference to the flowchart shown in FIG. 22.

First, in step ST110, the processing is started, and in step ST120, one frame or one field of SD signals are output to the device from the input terminal 515, for example. The SD signals input thus are temporarily stored in the RAM 503.

Next, in step ST130, determination is made regarding whether or not all frames or all fields of the SD signals have been processed. In the event that the processing has ended, the processing ends in step ST140. On the other hand, in the event that the processing has not ended, the flow proceeds to step ST150.

In step ST150, the SD signal is divided into blocks made up of two pieces of horizontally-adjacent pixel data, and the pixel data p1 and p2 (see FIG. 2) contained in the block is extracted as the class tap thereof, for each block.

In step ST160, the class tap is classified into one of multiple classes based on the class tap extracted in step ST150, and the class code #c thereof is obtained. In this case, the tap vector (p1, p2) having as the components thereof the pixel data p1 and p2 contained in the class tap is subjected to vector quantization using the class classification codebook (see FIG. 4) stored in the ROM 502, and the class code #c corresponding to the class tap is obtained.

Next, in ST170, four pieces of pixel data q1 through q4 (see FIG. 2) making up the HD signals are generated corresponding to the class tap extracted in step ST150, based on the class code #c of the class tap obtained in step ST160. In this case, the class code #c is subjected to inverse vector quantization using the data generating codebook (see FIG. 5) stored in the ROM 502, thereby obtaining the HD code vector (q1, q2, q3, q4) having as the components thereof the four pieces of pixel data q1 through q4 making up the HD signal.

Next, in step ST180, the SD error vector ($\Delta p1$, $\Delta p2$) is obtained by performing subtraction between the tap vector (p1, p2) having as the components thereof the pixel data p1 and p2 contained in the class tap extracted in step ST150 and the SD code vector (P1, P2) corresponding to class code #c (see FIG. 4), and the positive/negative symbol information (m1, m2) of the components $\Delta p1$ and $\Delta p2$ making up the SD error vector ($\Delta p1$, $\Delta p2$) is obtained.

In step ST190, correction data $\Delta q1$ through $\Delta q4$ corresponding to the class code #c obtained in step ST160 and the symbol information (m1, m2) obtained in step ST180 is obtained. In this case, the correction data $\Delta q1$ through $\Delta q4$ is obtained by reading out from the correction data table (see FIG. 17) stored in the ROM 502 the correction data $\Delta q1$ through $\Delta q4$ corresponding to the combination of the class code #c and the symbol information (m1, m2).

Next, in step ST200, the correction data $\Delta q1$ through $\Delta q4$ obtained instep ST190 is added to each of the four pieces of pixel data q1 through q4 making up the HD signals generated in step ST170 so as to perform correction, thereby obtaining the corrected four pieces of post-correction pixel data q1' through q4' making up the HD signals.

Next, in step ST210, determination is made regarding whether or not processing for obtaining HD signal pixel data has ended for the entire region of the one frame or one field of SD signal pixel data input in step ST120. In the event that this has ended, the flow returns to step ST120, and goes to the input processing for the next one frame or one field of SD signals. On the other hand, in the event than processing has not ended, the flow returns to step ST150, and goes to processing for the next class tap.

Figure 22:
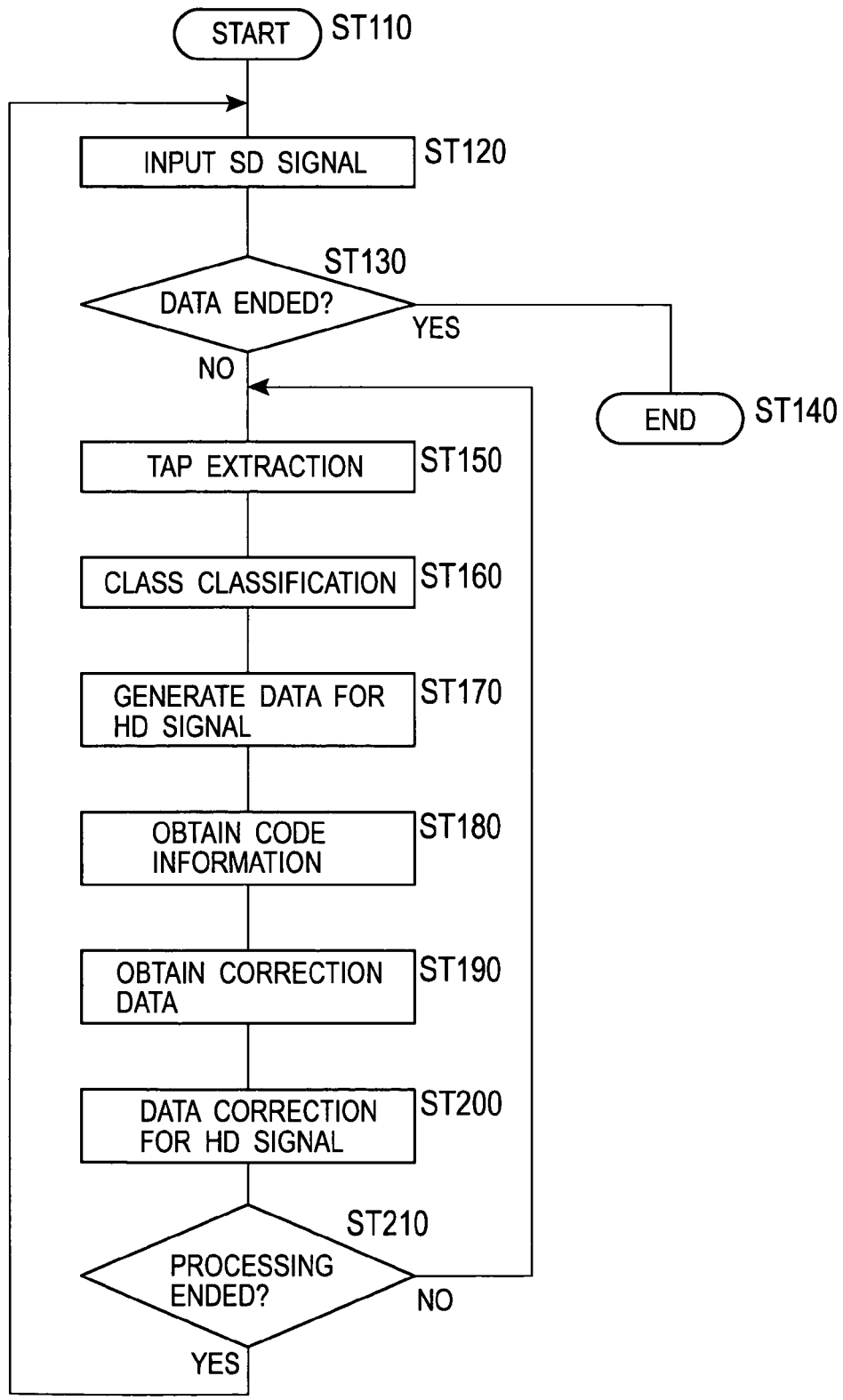
FIG. 22 is a flowchart illustrating image signal processing.

Thus, performing processing according to the flowchart shown in FIG. 22 enables obtaining HD signals from SD signals in the same way as with the image signal processing device 1000 shown in FIG. 12. The HD signals thus obtained are output to the output terminal 517, supplied to the display 513 for display, stored in the hard disk drive 505 and recorded, or the like.

Also, though omitted from the drawings, processing with the codebook generating device 2000 shown in FIG. 18 can also be performed by software.

Now, the processing procedures for generating the class classification codebook and data generating codebook will be described with reference to the flowchart shown in FIG. 23.

First, processing is started in step ST310, and in step ST320 one frame or one field of tutor signals corresponding to HD signals are input. In step ST330, student signals corresponding to SD signals are generated from the tutor signal input in step ST320. In this case, the pixel data number of the tutor signal corresponding to the HD signals is thinned out to ½ in the horizontal direction, thereby generating student signals corresponding to the SD signals.

Next, in step ST340, the first tap serving as student data is extracted based on the student signals generated in step ST330. In this case, the student signals are divided into first blocks made up of two horizontally-adjacent pieces of pixel data p1 and p2 (see FIG. 2), and the pixel data contained in the first block is extracted as the first tap, for each of the blocks.

Next, in step ST350, the second tap serving as tutor data is extracted based on the tutor signals input in step ST320. In this case, the tutor signals are divided into second blocks made up of four horizontally-adjacent pieces of pixel data q1 through q4 (see FIG. 2) corresponding to the first block obtained by the dividing in step ST340, and the pixel data contained in the second block is extracted as the second tap, for each of the blocks.

The processing in steps ST340 and ST350 generates multiple pairs of learning data (see FIG. 10) from the tutor signals and student signals of the one frame or one field. Note that one piece of learning data is made up of one piece of student data and one piece of tutor data.

Next, in step ST360, determination is made regarding whether or not processing of tutor signals has ended for all frames or all fields. In the event that the processing has not ended, the flow returns to step ST320, the next frame or field of tutor signals are input, and then the processing described above is repeated. On the other hand, in the event that processing has ended, the flow proceeds to step ST370.

In step ST370, the class classification codebook is generated. In this case, the class classification codebook (see FIG. 4) is generated with the LBG algorithm for example, based on multiple pieces of student data making up multiple pairs of learning data generated in the processing in steps ST320 through ST360, using the tap vector (p1, p2) having as the components thereof the two pieces of pixel data p1 and p2 contained in the student data.

Next, in step ST380, each of the multiple pieces of student data making up the multiple pieces of learning data generated in the processing in steps ST320 through ST360 are classified into one of multiple classes, and the class codes #c corresponding to each piece of student data are obtained. Further, in step ST380, code pair tutor data (see FIG. 20) wherein the class code #c corresponding to each of the student data and each tutor data which is paired with each student data are correlated, is generated.

Next, in step ST390, the data generating codebook (see FIG. 14) is generated based on the code pair tutor data generated in step ST380, using the tutor data appropriated to the same class code #c. In this case, the center of gravity of the vector having as the components thereof the pixel data contained in each piece of tutor data corresponding to the same class code #c is obtained, and the center-of-gravity vector is correlated with the class code #c as a code vector (HD code vector) (Q1, Q2, Q3, Q4) regarding HD signals, representing the class indicated by the class code #c. After the processing of step ST390, processing ends at step ST400.

Figure 23:
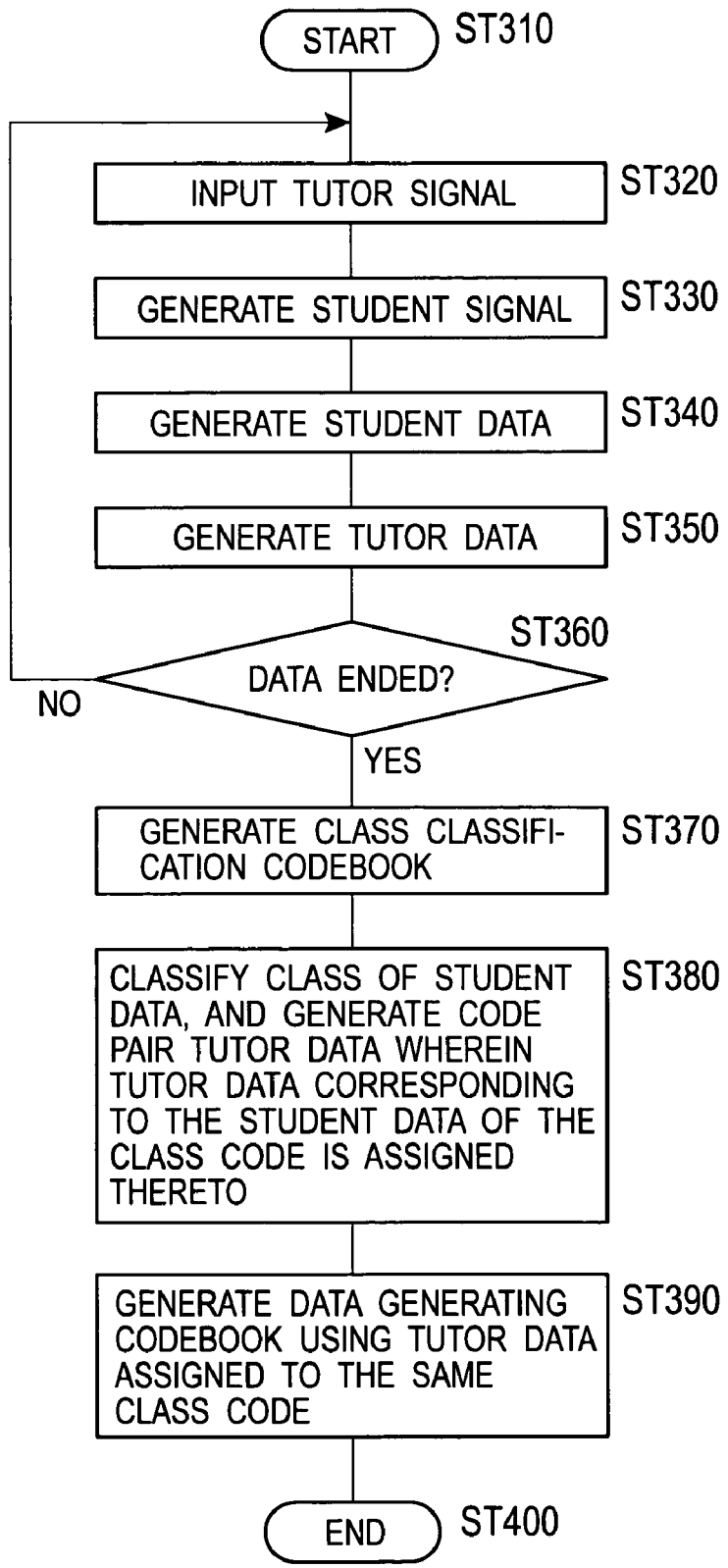
FIG. 23 is a flowchart illustrating codebook generating processing.

Thus, performing the processing according to the flowchart shown in FIG. 23 enables the class classification codebook and data generating codebook to be generated with the same procedures as with the codebook generating device 2000 shown in FIG. 18.

Also, though omitted from the drawings, processing with the correction data table generating device 3000 shown in FIG. 21 can also be performed by software. The processing procedures for generating a correction data table will be described with reference to the flowchart in FIG. 23.

First, processing is started in step ST510, and in step ST520 one frame or one field of tutor signals corresponding to HD signals are input. In step ST530, student signals corresponding to SD signals are generated from the tutor signal input in step ST520. In this case, the pixel data number of the tutor signal corresponding to the HD signals is thinned out to ½ in the horizontal direction, thereby generating student signals corresponding to the SD signals.

Next, in step ST540, the first tap serving as student data is extracted based on the student signals generated in step ST530. In this case, the student signals are divided into first blocks made up of two horizontally-adjacent pieces of pixel data p1 and p2 (see FIG. 2), and the pixel data contained in the first block is extracted as the first tap, for each of the blocks.

Next, in step ST550, the second tap serving as tutor data is extracted based on the tutor signals input in step ST520. In this case, the tutor signals are divided into second blocks made up of four horizontally-adjacent pieces of pixel data q1 through q4 (see FIG. 2) corresponding to the first block obtained by the dividing in step ST540, and the pixel data contained in the second block is extracted as the second tap, for each of the blocks.

The processing in steps ST540 and ST550 generates multiple pairs of learning data (see FIG. 10) from the tutor signals and student signals of the one frame or one field. Note that one piece of learning data is made up of one piece of student data and one piece of tutor data.

Next, in step ST560, determination is made regarding whether or not processing of tutor signals has ended for all frames or all fields. In the event that the processing has not ended, the flow returns to step ST520, the next frame or field of tutor signals are input, and then the processing described above is repeated. On the other hand, in the event that processing has ended, the flow proceeds to step ST570.

In step ST570, learning pair data of interest is selected from the multiple pieces of learning pair data generated in the processing in steps ST520 through ST560. In step ST580, the student data making up the learning pair data of interest is classified into one of multiple classes, yielding class code #c. In this case, the tap vector (p1, p2) having as the components thereof the pixel data p1 and p2 contained in the student data is subjected to vector quantization using the class classification codebook (see FIG. 4), thereby obtaining the class code #c corresponding to the student data. Also, in step ST580, the SD code vector (P1, P2) corresponding to the obtained class code #c is also obtained based on the class classification codebook.

Then, in step ST590, the SD code vector (P1, P2) obtained in step ST580 is subtracted from the tap vector (p1, p2) having as the components thereof the pixel data p1 and p2 contained in the student data making up learning pair data of interest, thereby obtaining the SD error vector ($\Delta$p1, $\Delta$p2). Also, the positive/negative symbol information (m1, m2) of the components $\Delta$p1 and $\Delta$p2 making up the SD error vector ($\Delta$p1, $\Delta$p2) is obtained in this step ST590.

Next, in step ST600, the HD code vector (Q1, Q2, Q3, Q4) corresponding to the student data is generated, based on the class code #c obtained in step ST580. In this case, the class code #c is subjected to inverse vector quantization using the data generating codebook (see FIG. 14), thereby obtaining the HD code vector (Q1, Q2, Q3, Q4).

In step ST610, the HD code vector (Q1, Q2, Q3, Q4) is subtracted from the tap vector (q1, q2, q3, q4) having as the components thereof the pixel data q1 through q4 contained in the tutor data making up the learning pair data of interest, thereby obtaining the HD error vector (Δq1, Δq2, Δq3, Δq4).

Then, in step ST620, the correlation between the symbol information (m1, m2) obtained in step ST590 and the HD error vector (Q1, Q2, Q3, Q4) obtained in step ST610 is stored for each class code #c obtained in step ST580.

Next, in step ST630, determination is made regarding whether or not processing of all learning data has ended. In the event that processing has not ended, the flow returns to step ST570, the next learning pair data of interest is selected, and the same processing as described above is repeated. On the other hand, in the event that the processing has ended, the flow proceeds to step ST640.

In step ST640, a correction data table (see FIG. 17) wherein each combination of class code #c and symbol information (m1 and m2) has appropriated thereto correction data Δq1 through Δq4 corresponding to that combination is generated based on the correlation between symbol information (m1, m2) and HD error vector (Q1, Q2, Q3, Q4) for each class code #c, regarding all learning pair data.

In this case, the center of gravity of the HD error vector (Δq1, Δq2, Δq3, Δq4) corresponding to this combination is obtained for each combination of class code #c and symbol information (m1 and m2), and the components making up the obtained center-of-gravity vector are used as the correction data Δq1 through Δq4 for the combination.

After the processing in step ST640 ends, the process ends in step ST650.

Figure 24:
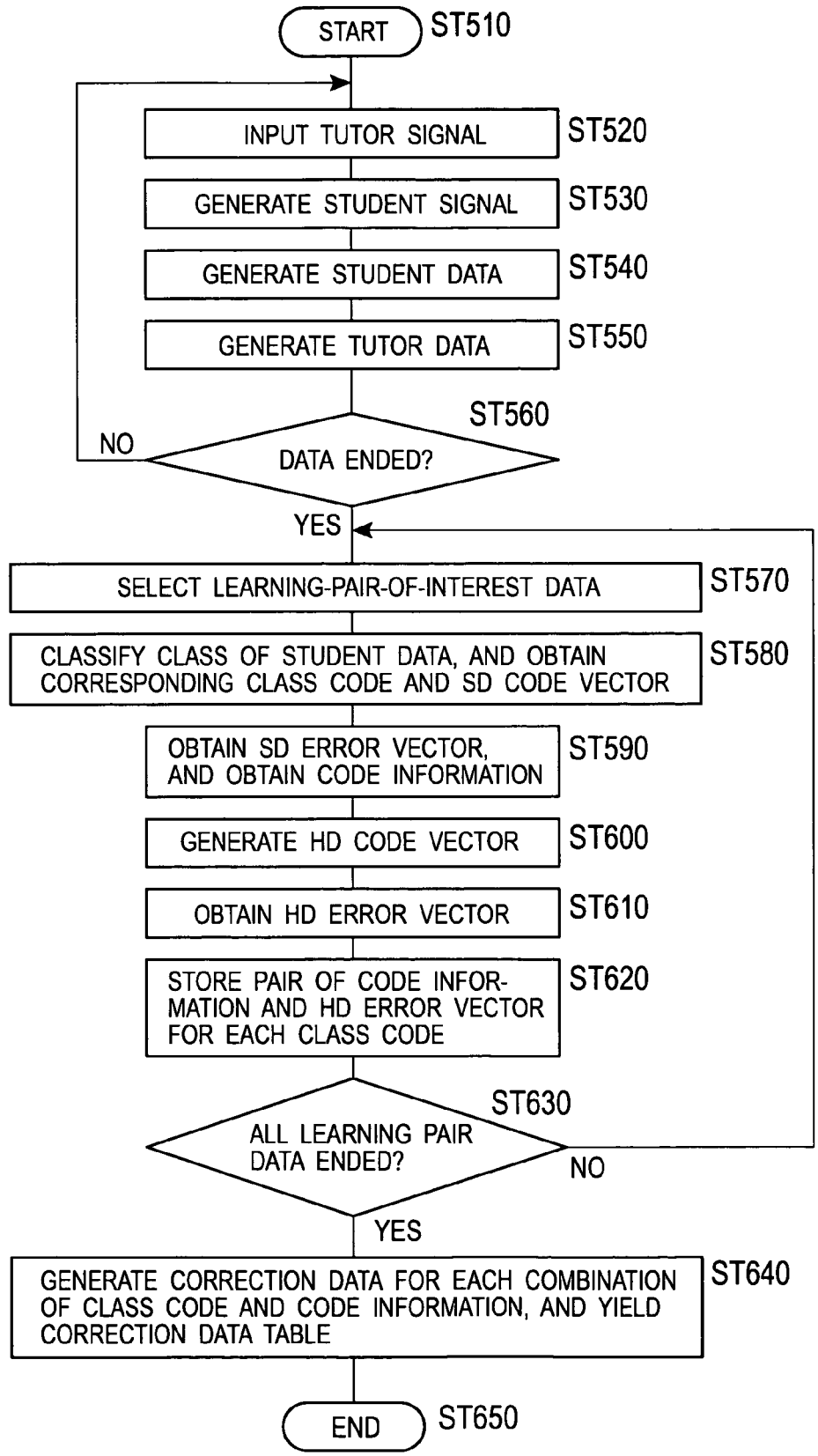
FIG. 24 is a flowchart illustrating correction data table generating processing.

In this way, performing processing according to the flowchart shown in FIG. 24 enables the correction data table to be generated with the same procedures as with the correction data table generating device 3000 shown in FIG. 21.

Note that with the image signal processing device 1000 shown in FIG. 12, SD signals are divided into blocks made up of two pieces of horizontally-adjacent pixel data, the pixel data p1 and p2 (see FIG. 2) contained in each block is extracted as the class tap thereof, for each block, and four pieces of horizontally-adjacent pixel data q1 through q4 (see FIG. 2) making up an HD signal are generated for each of the class taps, but it should be noted that the number and arrangements of the pixel data of the class taps and of the HD signals generated corresponding to the class taps are by no means restricted to this. That is to say, the number of pieces of pixel data contained in the class taps is not restricted to two, and further, the pixels do not need to be horizontally adjacent. Also, the number of pieces of pixel data of the HD signals generated corresponding to the class taps is not restricted to four, and further, the pixels do not need to be horizontally adjacent.

Also, while an arrangement has been illustrated for the image signal processing device 1000 shown in FIG. 12 wherein the data generating unit 1030 subjects the class code #c to inverse vector quantization using the data generating codebook, thereby obtaining four pieces of pixel data q1 through q4 making up the HD signals, the procedures for generating the pixel data making up the HD signals corresponding to the class code #c is not restricted to this. For example, pixel data making up HD signals can be calculated with a predetermined relational expression from the class code #c. In this case, the predetermined relational expression can be generated beforehand by learning.

Also, while an arrangement has been illustrated for the image signal processing device 1000 shown in FIG. 12 wherein the correction data calculating unit 1040 obtains the correction data Δq1 through Δq4 by reading the correction data Δq1 through Δq4 corresponding to the class code #c and symbol information (m1, m2) out from the correction data table, but the procedures for obtaining the correction data Δq1 through Δq4 corresponding to the class code #c and symbol information (m1, m2) is not restricted to this arrangement. For example, the correction data Δq1 through Δq4 can be calculated with a predetermined relational expression from the class code #c and symbol information (m1, m2). In this case, the predetermined relational expression can be generated beforehand by learning.

Also, while the present embodiment has been described using the positive/negative symbol information (m1, m2) thereof as range information for the values of the components making up the SD error vector (Δp1, Δp2), but the present invention is not restricted to this. That is to say, range information of the range which the values of the components can assume may be range information of not only negative or positive, but also indicating which of multiple ranges divided even more finely the values are included in.

Also, while an arrangement has been illustrated for the image signal processing device 1000 shown in FIG. 12 wherein SD signals are converted into HD signals which have twice the number of pixels in the horizontal direction, but the direction for increasing the number of pixels is not restricted to the horizontal direction, and arrangements can be conceived for increasing in the vertical direction, or further in the time direction (frame direction). Also, the present invention can be equally applied to arrangements for obtaining SD signals by reducing the number of pixels from HD signals. That is to say, the present invention can be generally applied to cases of converting first image signals into second image signals which have the same or different number of pixels as those of the first image signals.

Also, while the present embodiment has illustrated the information signals made up of multiple pieces of image data being image signals made up of multiple pieces of pixel data, the present invention is equally applicable to other types of information signals, such as audio signals for example. In the case of audio signals, the multiple pieces of image data would be multiple pieces of audio sample data.

Thus, according to the present invention, at the time of converting first information signals made up of a plurality of pieces of information data into second information signals made up of a plurality of pieces of information data, one or a plurality of pieces of information data making up the second information signals are generated for each block comprising one or a plurality of pieces of information data obtained by dividing the first information signals, based on the class code of class taps made up of information data contained in the blocks, and further, the generated information data is corrected by correction data, whereby the first information signals can be suitably converted into second information signals.

Also, according to the present invention, correction data is obtained based on an error vector obtained by performing subtraction between a tap vector having as the components thereof information data contained in the class tap and a representative vector corresponding to the class code, whereby correction data can be obtained with good precision.

Also, according to the present invention, correction data is obtained based on range information of values of the components making up the error vector obtained by performing subtraction between a tap vector having as the components thereof information data contained in the class tap and a representative vector corresponding to the class code, and the size of the correction data table can be reduced in comparison with cases wherein the components making up the error vector are used without change for example, whereby processing for obtaining the correction data can be facilitated.

What is claimed is:

1. An information signal processing device configured to convert a first information signal including a plurality of sets of first information data into a second information signal including a plurality of sets of second information data, said device comprising:
   a class tap extracting unit configured to divide said first information signal into blocks of one or more sets of said first information data, and to extract said first information data contained in each of said blocks as class taps for each block;
   a class classification unit configured to classify, based on said class taps extracted by said class tap extracting unit, each of said class taps into one of a plurality of classes, to obtain a class code;
   an auxiliary data generating unit configured to generate auxiliary data based on data based on at least said class taps extracted by said class tap extracting unit; and
   a data generating processing unit configured to generate said second information signal, corresponding to said class taps, according to a data generation codebook including said second information data corresponding to said first information data, based on
       said data based on said class taps, and
       said auxiliary data, wherein
   said first information signal and said second information signal are audio or video signals, and a resolution of said second information signal is higher than a resolution of said first information signal.

2. An information signal processing device according to claim 1, wherein said second information signal is generated based on said auxiliary data using a lower level signal than said second information signal.

3. An information signal processing device according to claim 2, wherein said auxiliary data generating unit is configured to generate said auxiliary data based on said data based on said class taps and features based on said class taps.

4. An information signal processing device according to claim 1, wherein said second information signal is generated based on said auxiliary data using a signal of a signal level that is equal to said second information signal.

5. An information signal processing device according to claim 1, wherein said data based on at least said class taps is said class code.

6. An information signal processing device according to claim 1, wherein said auxiliary data generating unit includes a features obtaining unit configured to obtain features relating to said class taps based on said class taps extracted at said class tap extracting unit, and to output said features as said auxiliary data; and
   said data generating processing unit is configured to generate one or a plurality of sets of said second information data included in said second information signal, corresponding to said class taps, based on
       the class code obtained based on said class taps, and
       said features.

7. An information signal processing device according to claim 6, wherein said data generating processing unit is configured to subject said class code to inverse vector quantization using said data generation codebook, based on the class code obtained by said class classification unit and said features obtained by said features obtaining unit, to obtain a code vector including as components thereof one or a plurality of pieces of said second information data included in said second information signal.

8. An information signal processing device according to claim 7, wherein said data generating processing unit comprises:
   a storage unit configured to store said data generation codebook, wherein representative vectors regarding said second information signal are appropriated to combinations of said class code and said features; and
   an inverse vector quantization unit configured to obtain a representative vector appropriated to the combination of said class code obtained by said class classification unit and said features obtained by said features obtaining unit, based on said data generation codebook, and to output the obtained representative vector as said code vector.

9. An information signal processing device according to claim 7, wherein said data generation codebook is obtained by learning beforehand.

10. An information signal processing device according to claim 1, wherein said class classification unit is configured to subject tap vectors, having as a component thereof information data contained in said class taps extracted by said class tap extracting unit, to vector quantization using a classification codebook, thereby obtaining class codes corresponding to said class taps.

11. An information signal processing device according to claim 10, wherein said class classification unit comprises:
   a storage unit configured to store said classification codebook, wherein representative vectors regarding said first information signal representing each of said plurality of classes have assigned thereto a class code indicating the corresponding class; and
   a vector quantization unit configured to obtain a distance of a tap vector and said representative vectors of the plurality of classes based on said classification codebook, and to output the class code assigned to said representative vector with the smallest distance.

12. An information signal processing device according to claim 1, wherein said auxiliary data generating unit comprises a correction data calculating unit configured to calculate correction data used by a data output unit, based on the class code obtained by said class classification unit and the class tap extracted by said class tap extracting unit; and
   said data generating processing unit comprises
       a data generating unit configured to generate one or a plurality of pieces of said second information data included in said second information signal corresponding to said class tap, based on the class code obtained by said class classification unit, and
       a data correcting unit configured to correct the one or a plurality of pieces of said second information data generated by said data generating unit.

13. An information signal processing device according to claim 12, wherein said class classification unit is configured to subject a tap vector having as components thereof information data contained in the class tap extracted by said class tap extracting unit to vector quantization, using a classification codebook, wherein representative vectors regarding said first information signal which represent each class have appropriated thereto a class code indicating a corresponding class, for each of said plurality of classes, to obtain said class code corresponding to said class tap; and
   said correction data calculating unit is configured to obtain said correction data based on range information of components included in an error vector, and based on said class code, said error vector having been obtained by performing subtraction between the tap vector having as the components thereof the information data contained in said class tap, and a representative vector corresponding to said class code.

14. An information signal processing device according to claim 13, wherein the range information of values of the components making up said error vector is negative/positive symbol information of the values of the components making up said error vector.

15. An information signal processing device according to claim 12, wherein said data generating unit is configured to subject the class code obtained by said class classification unit to inverse vector quantization using said data generation codebook, wherein representative vectors regarding the second information signal are appropriated to the class codes, to obtain a code vector having as components thereof one or a plurality of pieces of said second information data included in said second information signal.

16. An information signal processing device according to claim 12, wherein said correction data calculating unit is configured to extract second features from first features based on said class tap, and to generate said correction data based on said second features.

17. An information signal processing device according to claim 16, wherein said correction data calculating unit comprises a features class classification unit configured to obtain a features class code by classifying said first features into one of a plurality of features classes, with regard to said second features.

18. An information signal processing device according to claim 12, wherein said correction data calculating unit comprises:
   a storage unit configured to store a correction codebook, wherein representative vectors regarding said first information signal representing each class have appropriated thereto class codes indicating the corresponding class, for each of the plurality of classes;
   a features extracting unit configured to perform subtraction between a tap vector having as components thereof information data contained in said class tap, and a representative vector read out from said storage unit corresponding to said class code to obtain an error vector, to obtain range information of values of each component making up said error vector; and
   a correction data output unit configured to output said correction data based on said class code and the range information obtained by said features extracting unit.

19. An information signal processing device according to claim 18, wherein said correction data output unit is configured to read out and to output said correction data corresponding to the class code obtained by said class classification unit and said range information obtained by said features extracting unit, from a correction data table, wherein each combination of said class code and said range information has appropriated thereto said correction data.

20. An information signal processing device according to claim 19, wherein said correction data table is obtained by learning beforehand.

21. An information signal processing device according to claim 1, wherein said data generating processing unit is configured to generate said second information signal using said data generation codebook that includes a lookup table.

22. An information signal processing device according to claim 1, wherein said auxiliary data generating unit is configured to generate said auxiliary data independent of said class code.

23. An information signal processing method for converting a first information signal including a plurality of sets of first information data into a second information signal including a plurality of sets of second information data, said method comprising:
   dividing said first information signal into blocks of one or more sets of said first information data, and extracting said first information data contained in each of said blocks as class taps for each block;
   classifying, based on said class taps extracted in said dividing, said class taps into one of a plurality of classes, to obtain a class code;
   generating auxiliary data based on data based on at least said class taps extracted in said dividing; and
   generating, by a processor, said second information signal, corresponding to said class taps, according to a data generation codebook including said second information data corresponding to said first information data, based on
       said data based on said class taps, and
       said auxiliary data, wherein
   said first information signal and said second information signal are audio or video signals, and a resolution of said second information signal is higher than a resolution of said first information signal.

24. An information signal processing method according to claim 23, wherein said generating said second information signal comprises generating said second information signal using said data generation codebook that includes a lookup table.

25. An information signal processing method according to claim 23, wherein said generating comprises generating said auxiliary data independent of said class code.

26. A computer-readable storage medium having embedded therein instructions, which when executed by a computer, cause the computer to execute an information signal processing method for converting a first information signal including a plurality of sets of first information data into a second information signal including a plurality of sets of second information data, said method comprising:
   dividing said first information signal into blocks of one or more sets of said first information data, and extracting said first information data contained in each of said blocks as class taps for each block;
   classifying, based on said class taps extracted in said dividing, said class taps into one of a plurality of classes, to obtain a class code;
   generating auxiliary data based on data based on at least said class taps extracted in said dividing; and
   generating said second information signal, corresponding to said class taps, according to a data generation codebook including said second information data corresponding to said first information data, based on
       said data based on said class taps, and
       said auxiliary data, wherein
   said first information signal and said second information signal are audio or video signals, and a resolution of said second information signal is higher than a resolution of said first information signal.

27. A computer-readable storage medium according to claim 26, wherein said generating said second information signal comprises generating said second information signal using said data generation codebook that includes a lookup table.

28. A computer-readable storage medium according to claim 26, wherein said generating comprises generating said auxiliary data independent of said class code.

* * * * *